(12) United States Patent
Tsuchida

(10) Patent No.: US 7,649,993 B2
(45) Date of Patent: Jan. 19, 2010

(54) VIDEO-SIGNAL PROCESSING SYSTEM, VIDEO-SIGNAL PROCESSING APPARATUS AND METHOD, RECORDING MEDIUM, AND PROGRAM

(75) Inventor: Susumu Tsuchida, Tokyo (JP)

(73) Assignee: Sony Corporation (JP)

( * ) Notice: Subject to any disclaimer, the term of this patent is extended or adjusted under 35 U.S.C. 154(b) by 926 days.

(21) Appl. No.: 10/503,695

(22) PCT Filed: Dec. 8, 2003

(86) PCT No.: PCT/JP03/15645

§ 371 (c)(1),
(2), (4) Date: Aug. 5, 2004

(87) PCT Pub. No.: WO2004/056113

PCT Pub. Date: Jul. 1, 2004

(65) Prior Publication Data

US 2005/0213759 A1 Sep. 29, 2005

(30) Foreign Application Priority Data

Dec. 13, 2002 (JP) ............................. P2002-361690

(51) Int. Cl.
*H04N 7/167* (2006.01)
(52) U.S. Cl. .................... 380/203; 380/239; 705/51; 725/31; 726/31
(58) Field of Classification Search ................. 380/203, 380/239; 726/31; 705/51; 725/31
See application file for complete search history.

(56) References Cited

U.S. PATENT DOCUMENTS 5,852,502 A * 12/1998 Beckett ........................ 358/512
6,167,136 A * 12/2000 Chou ........................... 380/201
6,700,989 B1 * 3/2004 Itoh et al. ..................... 382/100
7,242,772 B1 * 7/2007 Tehranchi .................... 380/223
2001/0038422 A1  11/2001 Yamada et al.

FOREIGN PATENT DOCUMENTS

JP        5-328353 A    12/1993

(Continued)

OTHER PUBLICATIONS

"High-bandwidth Digital Content Protection System. Revision 1.0" High-Bandwidth Digital Content Protection System, (Feb. 17, 2000). pp. 1-60.

(Continued)

*Primary Examiner*—Matthew B. Smithers
*Assistant Examiner*—Paul Callahan
(74) *Attorney, Agent, or Firm*—Lerner, David, Littenberg, Krumholz & Mentlik, LLP

(57) ABSTRACT

The present invention relates to a video-signal processing system, a video-signal processing apparatus and method, a recording medium, and a program for immediately recovering from loss of synchronization while encrypting/decrypting a video signal. An encryption processing unit 22 encrypts a frame number Tx, which has been obtained by counting vertical control pulses of a video signal, and transmits the frame number Tx together with an unencrypted frame number Tx and an H/V control pulse. A decryption processing unit 32 decrypts the encrypted frame number Tx so as to generate a frame number Rx and supplies the frame number Rx together with the frame number Tx and the vertical control pulses to a correcting unit 33. The correcting unit 33 generates a pseudo load pulse when the frame numbers Tx and Rx do not match with each other 16 consecutive times, and supplies the pseudo load pulse to the encryption processing unit 22 and the decryption processing unit 32. The present invention can be applied to a display device compatible with digital television.

20 Claims, 17 Drawing Sheets

FOREIGN PATENT DOCUMENTS

| | | |
|---|---|---|
| JP | 7-240910 A | 9/1995 |
| JP | 11-053264 A | 2/1999 |
| JP | 11-055248 A | 2/1999 |
| JP | 2001-007796 A | 1/2001 |
| JP | 2001-036723 A | 2/2001 |
| JP | 2001-285828 A | 10/2001 |
| JP | 2002-353999 A | 12/2002 |
| WO | 02/30054 A1 | 4/2002 |

OTHER PUBLICATIONS

"Digital Visual Interface DVI" Digital Visual Interface DVI, XX, XX, No. Revision 1.0, (Apr. 2, 1999), pp. 1-76.

Supplementary European Search Report, EP 03777331.

* cited by examiner

FIG. 9

| THE NUMBER OF CLOCKS \ TERMINAL | 81Q | 82Q | 83Q | 84Q |
|---|---|---|---|---|
| AT RESET | 1 | 1 | 1 | 1 |
| 1 | 1 | 1 | 1 | 0 |
| 2 | 1 | 1 | 0 | 1 |
| 3 | 1 | 0 | 1 | 0 |
| 4 | 0 | 1 | 0 | 1 |
| 5 | 1 | 0 | 1 | 1 |
| 6 | 0 | 1 | 1 | 0 |
| 7 | 1 | 1 | 0 | 0 |
| 8 | 1 | 0 | 0 | 1 |
| 9 | 0 | 0 | 1 | 0 |
| 10 | 0 | 1 | 0 | 0 |
| 11 | 1 | 0 | 0 | 0 |
| 12 | 0 | 0 | 0 | 1 |
| 13 | 0 | 0 | 1 | 1 |
| 14 | 0 | 1 | 1 | 1 |
| 15 | 1 | 1 | 1 | 1 |

VIDEO-SIGNAL PROCESSING SYSTEM, VIDEO-SIGNAL PROCESSING APPARATUS AND METHOD, RECORDING MEDIUM, AND PROGRAM

TECHNICAL FIELD

The present invention relates to a video-signal processing system, a video-signal processing apparatus and method, a recording medium, and a program. In particular, the present invention relates to a video-signal processing system, a video-signal processing apparatus and method, a recording medium, and a program for recovering more immediately from a state where an encrypted video signal cannot be decrypted due to loss of synchronization.

BACKGROUND ART

In recent years, large and thin television receivers and back-projection projectors have become widespread in order to obtain stronger visuals within a setting space available in a home.

These television receivers and back-projection projectors have been becoming much thinner than conventional models with technical advances. Also, conventional cathode ray tubes (CRTs) are being replaced by display devices using liquid crystal or flat display panels such as plasma display panels (PDPs). In a flat display panel, a method in which a display to be hung on a wall and a television tuner unit are separated and are connected by using a cable has been proposed.

Further, digital versatile discs (DVDs) for high definition television (HDTV) have been proposed.

In DVDs or the like for HDTV, however, digital-signal processing is performed. In a presently-adopted connection method such as a digital terminal using an analog signal, a digital signal is once converted to an analog signal and then the analog signal is converted to a digital signal in a display side, so as to drive a display device, such as a display unit in HDTV (for example, see Japanese Unexamined Patent Application Publication No. 2001-36723). By performing the digital (D)/analog (A) conversion and the A/D conversion, unfavorable signal deterioration occurs.

In order to overcome this problem, another technique has been proposed. That is, a connection method using a digital signal, which has become the mainstream for connecting a personal computer (PC) and a liquid crystal display, is adopted for consumer apparatuses such as television receivers.

In the digital-signal connection, however, if data is duplicated in a state of digital signal, duplicates of expensive movie software or the like can be easily produced such that the duplicates include no degradation in the picture quality. Therefore, in order to protect a copyright, an encrypting process must be performed on a video signal at a connector portion for realizing the digital-signal connection and a video signal superimposed by a voice signal.

At the beginning of the encrypting process, a general authentication process is performed. That is, for example, each of transmitter and receiver sides holds several tens of groups of secret numeric sequences of several tens of bits, which serve as a common secret encryption key. An arbitrary about half of the numeric sequences are selected by a public key, so that a new random number sequence is generated. Then, the transmitter examines the numeric sequences so as to check whether or not the receiver on the other side is authorized to receive a signal to be transmitted. Accordingly, the transmitter judges that the receiver is formally authorized.

Then, the transmitter circulates the numeric sequences in a random-number generating circuit by using horizontal and vertical synchronizing signals serving as a reference for synchronizing a video signal, and randomly inverts the digital video signal by using this random number sequence, so as to encrypt the digital video signal, which is then transmitted. The receiver side generates a random number sequence by using the same numeric sequences and inverts the video signal so as to decrypt the encrypted signal, and then displays the original correct video signal.

At this time, each of the transmitter and receiver sides generates an encryption key based on the same numeric sequence. Then, by using this encryption key, each side cyclic-generates a random number sequence for several tens of clocks of a vertical synchronizing signal period defined by a pixel clock of the video signal, and once stores the value as a frame-key value. Then, the random number sequence is circulated and stopped in the same way in several tens of clocks of a horizontal synchronizing signal period of each video line which is subsequently input. Then, the value is led to a cyclic shift register circuit in the subsequent stage, and is generated as an encrypting random number sequence by a pixel clock of a display period of an effective video signal.

Therefore, even if the starting point of a display period of an effective video signal slightly varies due to noise, such as electro-static discharge (ESD), and accordingly an error is caused, a random number sequence generated in the immediately preceding horizontal synchronizing signal period is used in random-number generation for the next line. Therefore, continuous disturbance in decryption can be prevented.

If noise is mixed into a horizontal synchronizing signal or if a dropout of the horizontal synchronizing signal is caused, numeric sequences for generating random numbers may proceed or delay by one line. In this case, too, a random number sequence is generated by using numeric sequences stored in the immediately preceding vertical synchronizing signal period in the next frame (next field in a case of an interlace signal). Therefore, although a part corresponding to several lines may be distorted in the upper side of a screen, distortion of the displayed picture, which is caused by abnormal decryption, can be minimized to within one frame (or one field).

However, if noise is mixed into a vertical synchronizing signal or if a dropout of the vertical synchronizing signal is caused, a once-stored random number sequence serving as a frame-key value goes out of synchronization. Accordingly, distortion of the displayed picture caused by a decryption error continues for a long time. In general, however, the transmitter side constantly examines a secret value used as a reference value for generating random numbers in a cycle of about 128 frames so as to check whether a connected apparatus in the receiver side is continuously valid, and resets the reference value for generating random numbers. Therefore, a decryption error can be suppressed to within about two seconds (128 frames) at the maximum.

In scrambled digital television broadcasting or the like in the MPEG (Moving Picture Experts Group) 2 standard, a compressed video signal corresponding to several tens of frames is captured and then decoding and descrambling are performed at channel switching or the like. Thus, a pictureless-and-silent state may continue for about two seconds. If encryption and decryption errors are added thereto, the pictureless-and-silent state or a picture of encrypted random numbers (picture of a noise signal) continues for four seconds at the maximum, which is undesired.

Also, in digital broadcasting, particularly in commercials, a so-called "mixed-mode broadcasting", in which high-resolution-signal broadcasting and ordinary-signal broadcasting are switched to/from each other or a signal is switched in the opposite direction, may be performed. In this case, too, the "mixed-mode broadcasting" cannot be displayed if decryption of encrypted data delays.

Likewise, when a wall-hung television set is adopted, a cable used for digital connection needs to have a length of about 5 m. In this case, if an undesired noise component is mixed into a vertical synchronizing signal due to a momentary external noise, such as ESD, or if poor contact is caused at a cable connector portion, an undesired state where encrypted data cannot be decrypted continues for about two seconds.

DISCLOSURE OF INVENTION

An object of the present invention is to immediately recover from an undecryptable state caused by loss of synchronization while encrypting/decrypting a video signal.

A video-signal processing system of the present invention includes encrypting means for encrypting a video signal and a first frame number, which indicates a frame number of the video signal to be transmitted, based on a numeric sequence; transmitting means for transmitting an unencrypted first frame number, the video signal encrypted by the encrypting means, and the first frame number encrypted by the encrypting means; receiving means for receiving the unencrypted first frame number, the encrypted video signal, and the encrypted first frame number transmitted by the transmitting means; decrypting means for decrypting the encrypted first frame number and the encrypted video signal received by the receiving means, based on a numeric sequence; and generating means for generating an initializing pulse based on a second frame number indicating a frame number in a receiver side, the second frame number being generated by decrypting the encrypted first frame number by the decrypting means, and on the unencrypted first frame number received by the receiving means. The decrypting means initializes the numeric sequence based on the initializing pulse generated by the generating means.

The encrypting means may initialize the numeric sequence based on the initializing pulse generated by the generating means.

The generating means may generate the initializing pulse when the frame number decrypted by the decrypting means is different from the unencrypted frame number received by the receiving means.

The encrypting means and the transmitting means may be included in a first video-signal processing apparatus, and the receiving means, the decrypting means, and the generating means may be included in a second video-signal processing apparatus.

Communication between the transmitting means and the receiving means may be performed through a digital interface.

The transmitting means may also transmit a synchronizing pulse for synchronizing generation of the numeric sequence, and the receiving means may also receive the synchronizing pulse.

A video-signal processing method, a program recorded on a first recording medium, and a first program of the present invention include an encrypting step of encrypting a video signal and a first frame number, which indicates a frame number of the video signal to be transmitted, based on a numeric sequence; a transmitting step of transmitting an unencrypted first frame number, the video signal encrypted in the encrypting step, and the first frame number encrypted in the encrypting step; a receiving step of receiving the unencrypted first frame number, the encrypted video signal, and the encrypted first frame number transmitted in the transmitting step; a decrypting step of decrypting the encrypted first frame number and the encrypted video signal received in the receiving step, based on a numeric sequence; and a generating step of generating an initializing pulse based on a second frame number indicating a frame number in a receiver side, the second frame number being generated by decrypting the encrypted first frame number in the decrypting step, and on the unencrypted first frame number received in the receiving step. In the decrypting step, the numeric sequence is initialized based on the initializing pulse generated in the generating step.

A first video-signal processing apparatus of the present invention includes encrypting means for encrypting a video signal and a first frame number, which indicates a frame number of the video signal to be transmitted, based on a numeric sequence; and transmitting means for transmitting an unencrypted first frame number, the video signal encrypted by the encrypting means, and the first frame number encrypted by the encrypting means.

The transmitting means may also transmit a synchronizing pulse for synchronizing generation of the numeric sequence.

The first apparatus may further include receiving means for receiving an initializing pulse for initializing the numeric sequence transmitted from a receiver side. The encrypting means may initialize the numeric sequence based on the initializing pulse received by the receiving means.

A second video-signal processing method, a program recorded on a second recording medium, and a second program of the present invention include an encrypting step of encrypting a video signal and a first frame number, which indicates a frame number of the video signal to be transmitted, based on a numeric sequence; and a transmitting step of transmitting an unencrypted first frame number, the video signal encrypted in the encrypting step, and the first frame number encrypted in the encrypting step.

A second video-signal processing apparatus of the present invention includes receiving means for receiving an unencrypted first frame number indicating a frame number of a video signal, an encrypted video signal, and an encrypted first frame number; decrypting means for decrypting the encrypted first frame number and the encrypted video signal received by the receiving means, based on a numeric sequence; and generating means for generating an initializing pulse based on a second frame number indicating a frame number in a receiver side, the second frame number being generated by decrypting the encrypted first frame number by the decrypting means, and on the unencrypted first frame number received by the receiving means. The decrypting means initializes the numeric sequence based on the initializing pulse generated by the generating means.

The generating means may generate the initializing pulse when the frame number decrypted by the decrypting means is different from the unencrypted frame number received by the receiving means.

The second apparatus may further include transmitting means for transmitting the initializing pulse to the party on the other end which has transmitted the encrypted video signal and first frame number.

A third video-signal processing method, a program recorded on a third recording medium, and a third program of the present invention include a receiving step of receiving an unencrypted first frame number indicating a frame number of a video signal, an encrypted video signal, and an encrypted first frame number; a decrypting step of decrypting the encrypted first frame number and the encrypted video signal received in the receiving step, based on a numeric sequence; and a generating step of generating an initializing pulse based on a second frame number indicating a frame number in a receiver side, the second frame number being generated by decrypting the encrypted first frame number in the decrypting step, and on the unencrypted first frame number received in the receiving step. In the decrypting step, the numeric sequence is initialized based on the initializing pulse generated in the generating step.

In a first aspect of the present invention, a video signal and a first frame number, which indicates a frame number of the video signal to be transmitted, are encrypted based on a numeric sequence. An unencrypted first frame number, the encrypted video signal, and the encrypted first frame number are transmitted and are received. The encrypted first frame number and the encrypted video signal are decrypted based on a numeric sequence. An initializing pulse is generated based on a second frame number indicating a frame number in a receiver side, the second frame number being generated by decrypting the encrypted first frame number, and on the unencrypted first frame number. The numeric sequence for decryption is initialized based on the initializing pulse.

In a second aspect of the present invention, a video signal and a first frame number, which indicates a frame number of the video signal to be transmitted, are encrypted based on a numeric sequence. An unencrypted first frame number, the encrypted video signal, and the encrypted first frame number are transmitted.

In a third aspect of the present invention, an unencrypted first frame number indicating a frame number of a video signal, an encrypted video signal, and an encrypted first frame number are received, and the encrypted first frame number and the encrypted video signal are decrypted based on a numeric sequence. An initializing pulse is generated based on a second frame number indicating a frame number in a receiver side, the second frame number being generated by decrypting the encrypted first frame number, and on the received unencrypted first frame number. The numeric sequence for decryption is initialized based on the initializing pulse.

BRIEF DESCRIPTION OF THE DRAWINGS

FIG. 9 shows a random number sequence output from each flip-flop of the LFSR shown in FIG. 8.

BEST MODE FOR CARRYING OUT THE INVENTION

Figure 1:
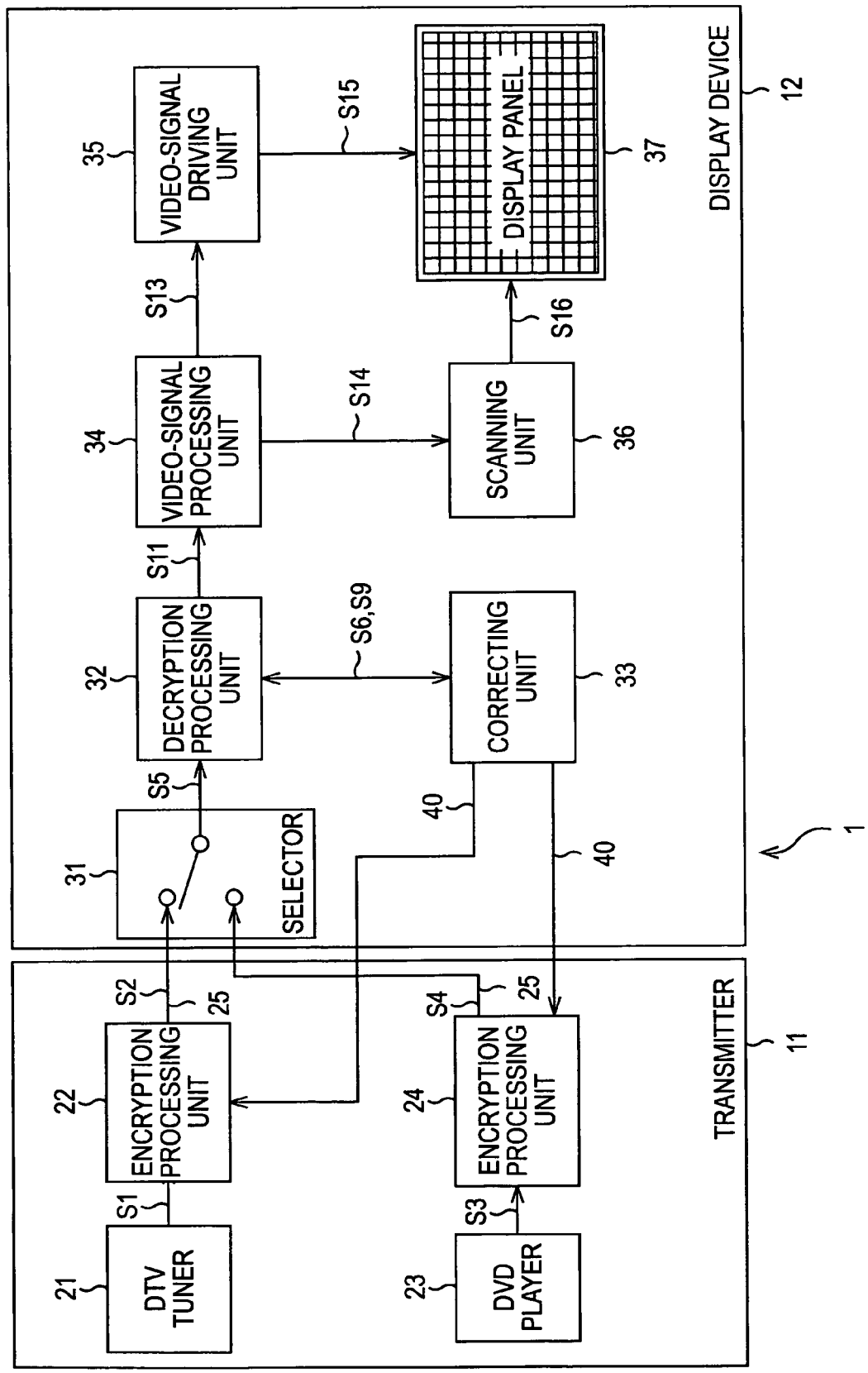
FIG. 1 is a block diagram showing an example of the configuration of a video-signal processing system to which the present invention is applied.

FIG. 1 shows an example of the configuration of a video-signal processing system 1, to which the present invention is applied.

In this configuration, a wall-hung display device, such as a liquid crystal display or a plasma display panel (PDP), is used, for example. A transmitter 11 (transmitter side) includes a digital television (DTV) tuner 21, an encryption processing unit 22, a digital versatile disc (DVD) player 23, and an encryption processing unit 24. A display device 12 (receiver side) includes a selector 31, a decryption processing unit 32, a correcting unit 33, a video-signal processing unit 34, a video-signal driving unit 35, a scanning unit 36, and a display panel 37. In the figure, characters representing steps correspond to the steps in the flowchart shown in FIGS. 2 and 3, which will be described later.

The DTV tuner 21 receives a digital broadcast signal of the MPEG 2 standard, which has been received by an antenna (not shown), and demodulates the signal so as to obtain a video signal. Then, the DTV tuner 21 supplies the video signal to the encryption processing unit 22.

The DVD player 23 plays a DVD (not shown) so as to obtain a digital video signal (video signal), and supplies the digital video signal to the encryption processing unit 24.

The encryption processing units 22 and 24 encrypt the video signal supplied from the DTV tuner 21 and the video signal supplied from the DVD player 23, respectively. The encrypting process will be described later with reference to FIGS. 4 to 6. Also, the encryption processing units 22 and 24 encrypt a frame number Tx indicating the position of a frame in a cycle consisting of 128 frames (a frame number obtained by counting the number of vertical synchronizing signals of a video signal, for example, any value of 1 to 128).

The encryption processing units 22 and 24 are connected to the selector 31 of the display device 12 through a digital interface 25. The encrypted video signal, the unencrypted frame number Tx, an H/V control signal (described later), and the encrypted frame number Tx are supplied to the selector 31 through the digital interface 25. In the digital interface 25, a digital video signal and a voice signal superimposed during a blanking period are encrypted. In the state of this signal, illegal copy to a video tape recorder (VTR) or the like through this line cannot be performed (even if copied, the data cannot be decrypted and thus cannot be used).

At this time, the encryption processing units 22 and 24 transmit the unencrypted frame number Tx (of course, having the same value as that of the encrypted frame number Tx) and the H/V control signal together with the encrypted video signal and frame number Tx. The former two elements are not encrypted but the latter two elements are encrypted.

The selector 31 selects one of the signals from the encryption processing units 22 and 24 based on the instructions from a user and supplies the selected signal to the decryption processing unit 32.

The decryption processing unit 32 first decrypts the encrypted frame number Tx. The decrypted frame number Tx is set as a frame number Rx. The decryption processing unit 32 supplies the H/V control signal, the unencrypted frame number Tx, and the set frame number Rx (obtained by decrypting the frame number Tx, which has been encrypted by the encryption processing unit 22 or 24, by the decryption processing unit 32) in the input signal to the correcting unit 33.

The correcting unit 33 compares the frame number Tx (unencrypted frame number Tx) and the frame number Rx (frame number in the receiver side) set by the decryption processing unit 32, both frame numbers Tx and Rx having been supplied from the decryption processing unit 32, so as to detect a count error. When the frame number Rx in the receiver side does not match with the frame number Tx in the transmitter side, or when vertical control pulses supplied from the decryption processing unit 32 are counted with 128 frames being one cycle and the counted frame number returns from 128 (about two seconds) to 1, the correcting unit 33 generates a load pulse. The correcting unit 33 supplies the generated load pulse to the encryption processing unit 22 or 24 (encryption processing unit which has supplied the encrypted video signal among the encryption processing units 22 and 24) and to the decryption processing unit 32 through a cable 40.

The decryption processing unit 32 decrypts the encrypted video signal based on the vertical control pulses. If the load pulse is supplied thereto from the correcting unit 33, the decryption processing unit 32 resets an encrypting-random-number generating unit 51, which will be described later with reference to FIG. 4.

The encryption processing unit 22 or 24 resets an internal random-number generating unit 41 (FIG. 4), which will be described later, upon receiving the load pulse from the correcting unit 33.

Accordingly, even if a count error of a frame number based on a vertical synchronizing signal in the receiver side (display device 12) occurs due to a disturbance noise signal caused by ESD mixed into a transmission line between the transmitter 11 and the display device 12 (transmission line for the vertical synchronizing signal), the correcting unit 33 generates a load pulse so as to reset the encryption processing unit 22 or 24 and the decryption processing unit 32. Therefore, an undecryptable state, which is caused by loss of synchronization during decryption, can be immediately recovered, and thus a decrypted picture can be stably displayed.

The video-signal processing unit 34 processes the decrypted video signal, adjusts the brightness, color, hue, contrast, and white balance based on the instructions of a user so as to realize an optimum signal level for the display panel (display element) 37, and supplies the video signal to the video-signal driving unit 35 in the horizontal (line) direction.

The video-signal driving unit 35 drives the display panel 37 based on the video signal supplied from the video-signal processing unit 34.

Also, the video-signal processing unit 34 obtains horizontal and vertical synchronizing signals for synchronization from the decrypted video signal and supplies these signals to the scanning unit 36 for the display panel 37. The scanning unit 36 sequentially scans lines in the vertical direction by driving each horizontal line direction, and performs control so as to display a picture corresponding to a video signal for one frame.

The display panel 37 performs display based on the supplied video signal under control by the video-signal driving unit 35 and the scanning unit 36.

Next, a video display process performed by the video-signal processing system 1 shown in FIG. 1 will be described with reference to FIG. 2. This process is started when the user instructs the DTV tuner 21 or the DVD player 23 to perform a receiving process or a playback process.

In step S1, the DTV tuner 21 receives a digital broadcast signal of the MPEG 2 standard, which has been received by an antenna (not shown), and demodulates the signal so as to obtain a video signal. Then, the DTV tuner 21 supplies the video signal to the encryption processing unit 22.

In step S2, the encryption processing unit 22 counts vertical synchronizing signals of the video signal supplied from the DTV tuner 21 so as to generate a frame number Tx, and encrypts the frame number Tx and the video signal. Then, the encryption processing unit 22 supplies the encrypted frame number Tx, the encrypted video signal, an H/V control signal, and the unencrypted frame number Tx to the selector 31 through the digital interface 25. Details of the encrypting process will be described later with reference to the flowchart shown in FIGS. 5 and 6.

In step S3, the DVD player 23 plays a DVD (not shown) so as to obtain a digital video signal (video signal), and supplies the video signal to the encryption processing unit 24.

In step S4, the encryption processing unit 24 counts vertical synchronizing signals of the video signal supplied from the DVD player 23 so as to generate a frame number Tx, and encrypts the frame number Tx and the video signal. Then, the encryption processing unit 24 supplies the encrypted frame number Tx, the encrypted video signal, an H/V signal, and the unencrypted frame number Tx to the selector 31 through the digital interface 25. The encrypted frame number Tx may be transmitted, for example, during a horizontal blanking period.

Actually, steps S1 and S2 or steps S3 and S4 are performed according to user's instructions.

In step S5, the selector 31 selects one of the signals from the encryption processing units 22 and 24 based on the user's instructions.

In step S6, the decryption processing unit 32 obtains the encrypted frame number Tx, the encrypted video signal, the H/V control signal, and the unencrypted frame number Tx which have been selected by the selector 31, decrypts the encrypted frame number Tx, and sets the value as a frame number Rx (as a frame number in the receiver side). The decryption processing unit 32 supplies the H/V control signal, the unencrypted frame number Tx, and the frame number Rx obtained by decryption to the correcting unit 33.

In step S7, the correcting unit 33 judges whether or not a load pulse need be generated based on the frame number Rx supplied from the decryption processing unit 32 (the value of the frame number Rx is equal to that of the frame number Tx which has been encrypted by the encryption processing unit 22 or 24 and decrypted by the decryption processing unit 32) and on the frame number Tx associated with each frame of the video signal supplied from the encryption processing unit 22 or 24. Specifically, the correcting unit 33 judges that a load pulse need be generated when the frame number Tx does not match with the frame number Rx by a predetermined number of times (for example, 16 consecutive times), or when the supplied frame numbers Rx and Tx match with each other and when the frame numbers (Tx and Rx) return from 128 (about two seconds) to 1 (that is, once a two seconds).

If it has been judged that a load pulse need be generated in step S7, the process proceeds to step S8, where the correcting unit 33 generates a load pulse. Details of a load-pulse generating process performed by the correcting unit 33 will be described later with reference to FIGS. 13 and 14.

In step S9, the correcting unit 33 supplies the generated load pulse to the decryption processing unit 32 and the encryption processing unit 22 or 24 (the encryption processing unit selected by the selector 31 in step S5). By being provided with the load pulse, the encryption processing unit 22 or 24 and the decryption processing unit 32 are reset.

If it has been judged that a load pulse need not be generated in step S7 (if it has been judged that the frame number Rx matches with the frame number Tx), or after step S9, the process proceeds to step S10, where the decryption processing unit 32 decrypts the encrypted video signal based on the H/V control signal supplied in step S5. The process performed by the decryption processing unit 32 in steps S6 and S10 will be described later with reference to the flowchart shown in FIG. 7.

In step S11, the decryption processing unit 32 supplies the decrypted video signal to the video-signal processing unit 34.

In step S12, the video-signal processing unit 34 performs predetermined signal processing on the supplied video signal. Specifically, the video-signal processing unit 34 adjusts the brightness, color, hue, and contrast based on user control and adjusts the white balance, so as to obtain an optimum signal level for the display panel (display element) 37.

In step S13, the video-signal processing unit 34 supplies the processed video signal to the video-signal driving unit 35.

In step S14, the video-signal processing unit 34 obtains horizontal and vertical synchronizing signals for synchronization from the processed video signal and supplies the signals to the scanning unit 36 for the display panel 37.

In step S15, the video-signal driving unit 35 drives the display panel 37 based on the processed video signal supplied from the video-signal processing unit 34.

In step S16, the scanning unit 36 sequentially scans lines in the vertical direction by driving each horizontal line direction based on the supplied horizontal and vertical synchronizing signals, and performs control so as to display a picture corresponding to a video signal for one frame.

In step S17, the display panel 37 displays video based on the supplied video signal under the control by the video-signal driving unit 35 and the scanning unit 36, and then the process is completed.

Figure 2:
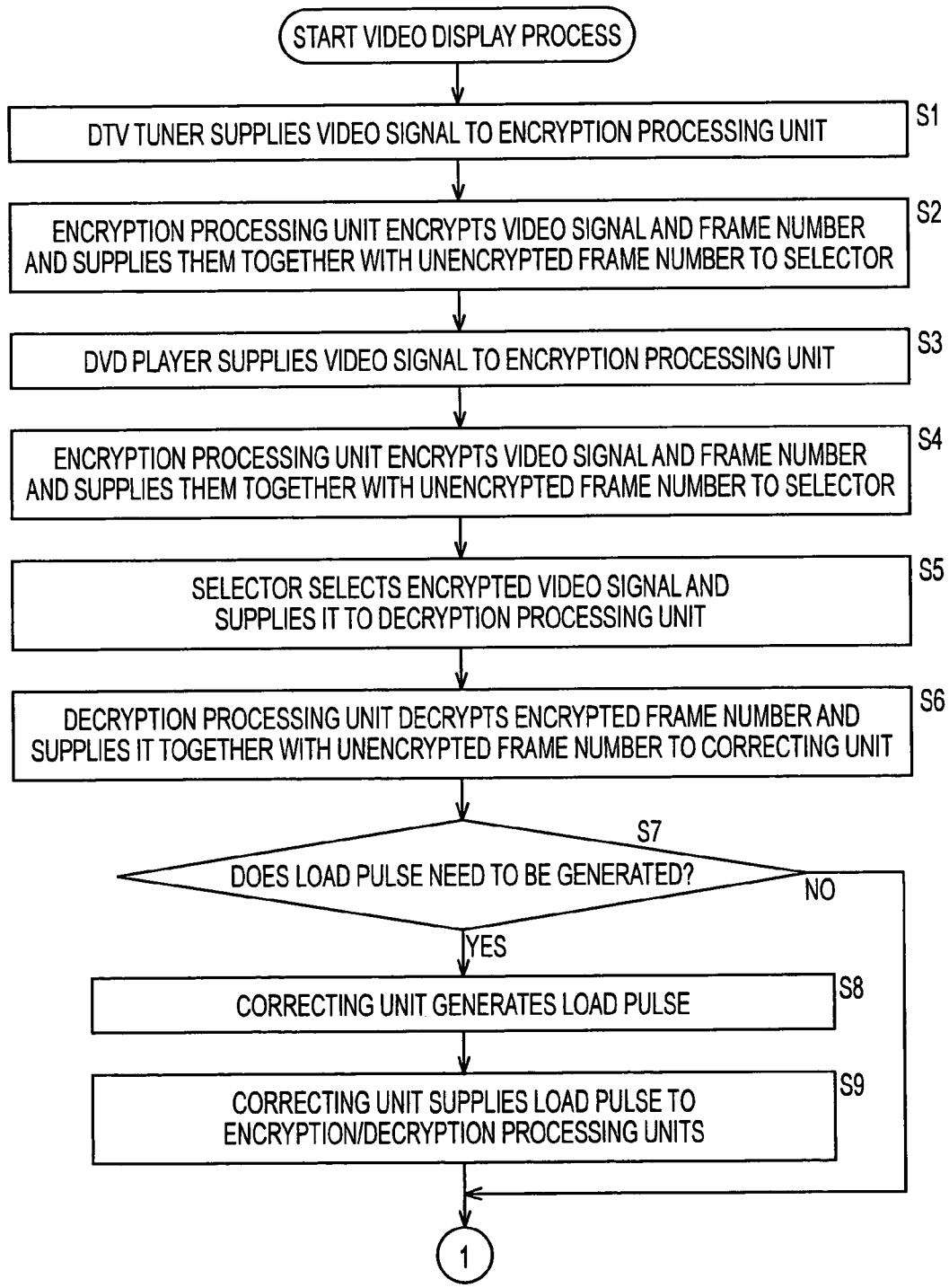
FIG. 2 is a flowchart for illustrating a video display process in the video-signal processing system shown in FIG. 1.
Figure 3:
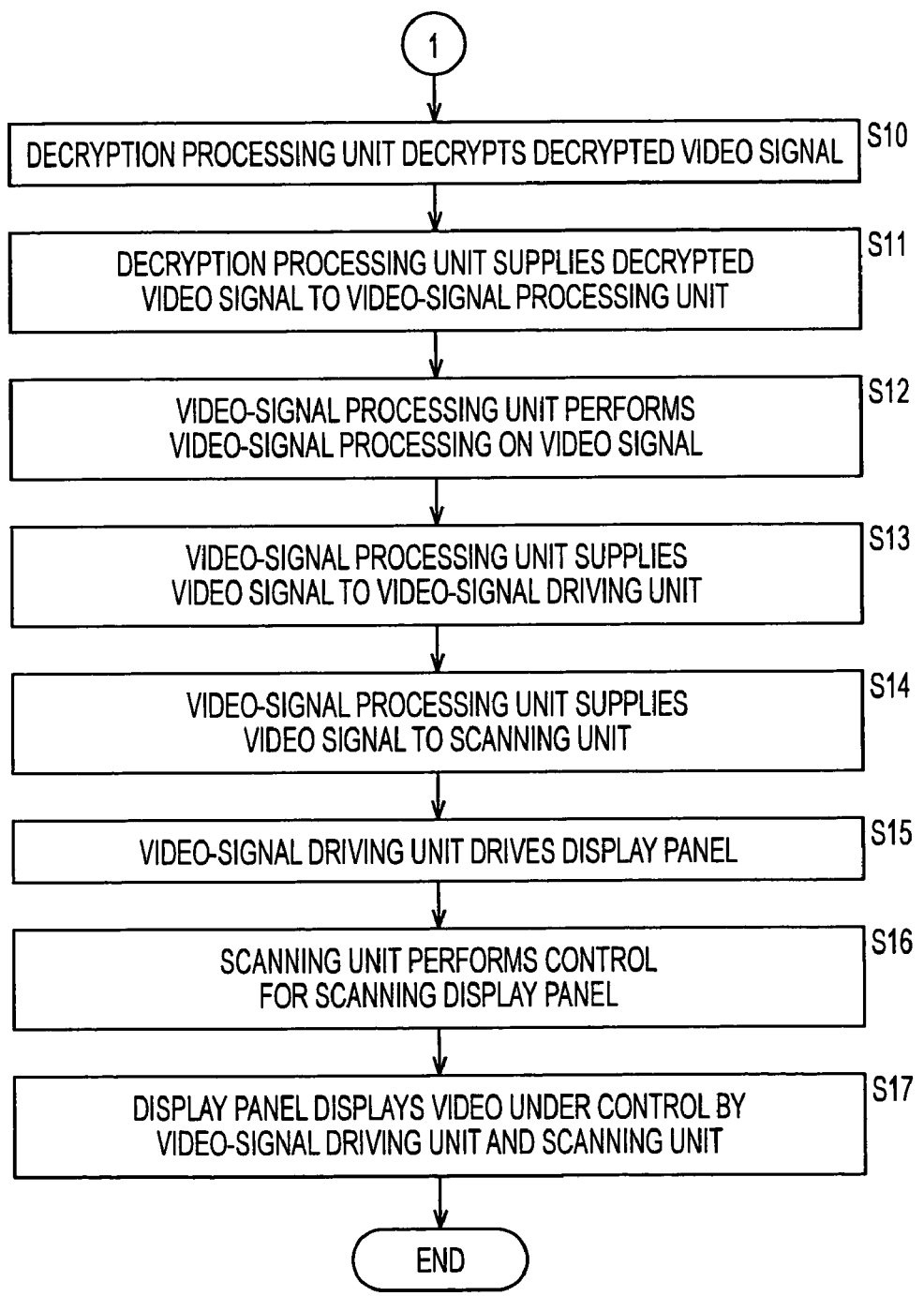
FIG. 3 is the flowchart for illustrating the video display process in the video-signal processing system shown in FIG. 1.

In the process shown in FIGS. 2 and 3, when the transmitter side (the encryption processing unit 22 or 24 of the transmitter 11) and the receiver side (the decryption processing unit 32 of the display device) are out of synchronization, or when the frame number returns from 128 to 1 (at each cycle of 128 frames), the correcting unit 33 generates a load pulse and supplies the load pulse to the transmitter side (the encryption processing unit 22 or 24 of the transmitter 11) and the receiver side (the decryption processing unit 32 of the display device) at the same time. Accordingly, encryption (transmitter side) and decryption (receiver side) can be reset so as to synchronize the both sides.

Next, the processes in the encryption processing unit 22 and the decryption processing unit 32 shown in FIG. 1 will be described with reference to FIGS. 4 to 7. First, a functional structure of the encryption processing unit 22, the decryption processing unit 32, and the correcting unit 33 shown in FIG. 1 will be described with reference to FIG. 4. The process in the encryption processing unit 24 is the same as that in the encryption processing unit 22, and thus the corresponding description will be omitted.

The encryption processing unit 22 includes an encrypting-random-number generating unit 41 and an exclusive-OR circuit 42. The decryption processing unit 32 includes a decrypting-random-number generating unit 51 and an exclusive-OR circuit 52. The decrypting-random-number generating unit 51 decrypts the encrypted frame number Tx and sets the obtained value as a frame number Rx in the receiver side. The decrypting-random-number generating unit 51 transmits vertical control pulses, the unencrypted frame number Tx, and the decrypted frame number Rx to the correcting unit 33.

The correcting unit 33 compares the frame number Tx and the frame number Rx so as to detect loss of synchronization between the transmitter side and the receiver side. If the correcting unit 33 has judged that the both sides are out of synchronization (that is, a load pulse need be generated), or every 128 frames, the correcting unit 33 generates a load pulse and supplies the generated load pulse to the decrypting-random-number generating unit 51 and the encrypting-random-number generating unit 41.

When the load pulse is supplied from the correcting unit 33, the decrypting-random-number generating unit 51 and the encrypting-random-number generating unit 41 receive the load pulse, so as to reset generation of random numbers for encryption or decryption.

Figure 4:
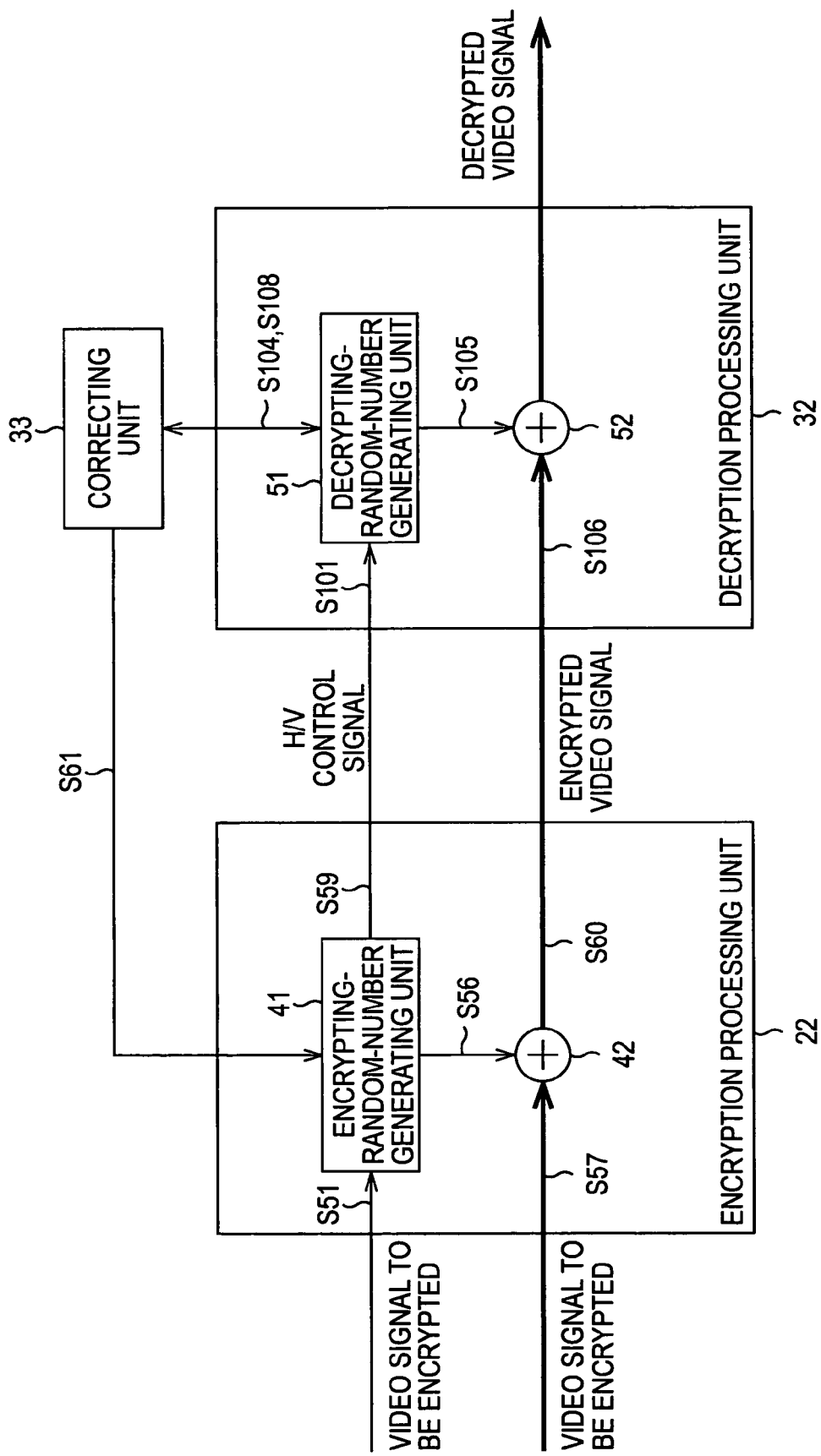
FIG. 4 is a block diagram showing a functional structure of an encryption processing unit and a decryption processing unit shown in FIG. 1.

In the example shown in FIG. 4, the digital interface 25, the selector 31, and the cable 40 are not shown. In FIG. 4, characters representing steps correspond to the processes in the flowcharts shown in FIGS. 5 to 7, which will be described later.

Next, an encrypting process performed by the encryption processing unit 22 will be described with reference to the flowchart shown in FIGS. 5 and 6. This flowchart is for specifically explaining the above-described step S2 in FIG. 2. This process is started when a video signal is supplied to the encryption processing unit 22 from the DTV tuner 21.

In step S51, the encrypting-random-number generating unit 41 obtains a video signal to be encrypted (for example, stream data of a video signal).

In step S52, the encrypting-random-number generating unit 41 generates vertical and horizontal control pulses and pixel clocks in synchronization with vertical and horizontal synchronizing signals included in the obtained video signal.

In step S53, the encrypting-random-number generating unit 41 counts the vertical synchronizing signals included in the video signal obtained in step S52 with 128 frames being one cycle, so as to calculate the frame number Tx.

In step S54, the encrypting-random-number generating unit 41 generates a random number sequence based on a secret key (the encrypting-random-number generating unit 41 holds a secret key of the transmitter side) of the transmitter side (transmitter 11). Specifically, a numeric sequence for initialization is generated based on the secret key, and a random number sequence is generated by cyclic driving based on the vertical and horizontal control pulses and the pixel clocks of the video signal.

In step S55, the encrypting-random-number generating unit 41 encrypts the frame number Tx based on the generated random number sequence.

In step S56, the encrypting-random-number generating unit 41 supplies the generated random number sequence (random number sequence generated in step S54) to the exclusive-OR circuit 42. The process of generating a random number sequence in steps S51 to S56 will be described later with reference to the flowchart shown in FIGS. 11 and 12.

In step S57, the exclusive-OR circuit 42 obtains the video signal to be encrypted and also obtains the random number sequence supplied from the encrypting-random-number generating unit 41 in step S54.

In step S58, the exclusive-OR circuit 42 operates the exclusive OR of the random number sequence supplied from the encrypting-random-number generating unit 41 (random number sequence generated by the encrypting-random-number generating unit 41 in step S54) and the video signal, so as to encrypts bit information of the video signal to be encrypted.

In step S59, the encrypting-random-number generating unit 41 supplies the H/V control signal including the vertical and horizontal control pulses of the video signal and the pixel clock of the video signal, the frame number Tx generated in step S53, and the encrypted frame number Tx generated in step S55 to the decrypting-random-number generating unit 51 of the decryption processing unit 32.

In step S60, the exclusive-OR circuit 42 supplies the video signal which has been encrypted in step S58 to an exclusive-OR circuit 52 of the decryption processing unit 32 in the receiver side (display device 12).

In step S61, the encrypting-random-number generating unit 41 judges whether or not a load pulse has been transmitted thereto from the correcting unit 33. When the transmitter side (encryption processing unit 22 or 24 of the transmitter 11) and the receiver side (decryption processing unit 32 of the display device) are out of synchronization or when the frame number returns from 128 to 1, the correcting unit 33 generates a load pulse and transmits the generated load pulse to the encrypting-random-number generating unit 41 and the decrypting-random-number generating unit 51. If it has been judged that the load pulse has been transmitted, the encrypting-random-number generating unit 41 receives the load pulse in step S62 and resets an LFSR module 111, which will be described later. The above-described process is continued until all video signals have been transmitted. If it has been judged that the load pulse has not been transmitted in step S61, step S62 is skipped.

Next, a decrypting process performed by the decryption processing unit 32, corresponding to the process by the encryption processing unit 22 in FIGS. 5 and 6, will be described with reference to the flowchart shown in FIG. 7. This flowchart is for specifically explaining the above-described steps S6 and S10 in FIG. 2. This process is started when the encrypted video signal, the H/V control signal, the frame number Tx, and the encrypted frame number Tx are supplied from the encryption processing unit 22 to the decryption processing unit 32.

Figure 6:
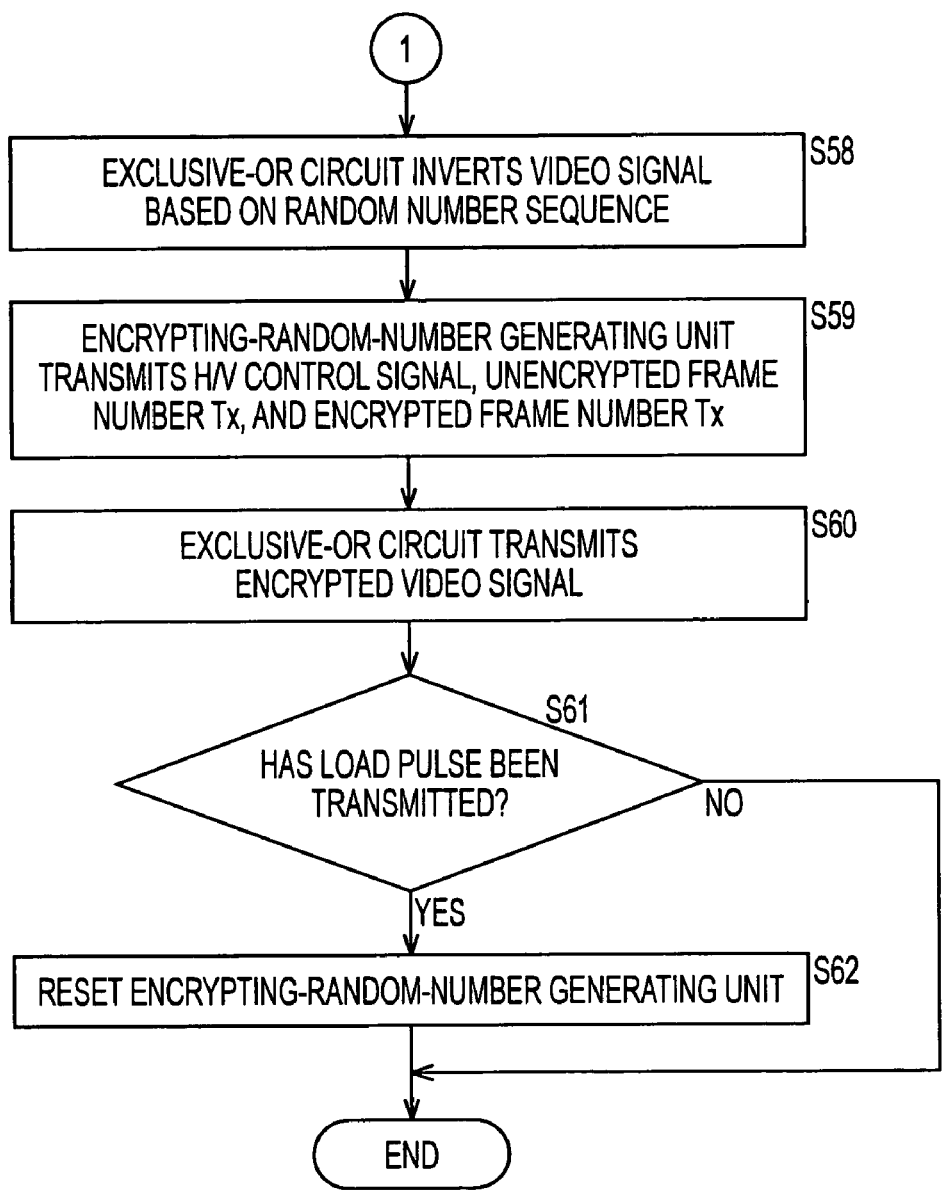
FIG. 6 is the flowchart for illustrating the encrypting process in the encryption processing unit shown in FIG. 4.

In step S101, the decrypting-random-number generating unit 51 obtains the H/V control signal (signal including the vertical and horizontal control pulses and the pixel clocks of the video signal), the unencrypted frame number Tx, and the encrypted frame number Tx, which have been supplied from the encryption processing unit 22 (step S59 in FIG. 6).

In step S102, the decrypting-random-number generating unit 51 generates a random number sequence based on the received vertical control pulses and the held key. As in the above-described encrypting-random-number generating unit 41, the decrypting-random-number generating unit 51 holds a key corresponding to the secret key in the transmitter side. The decrypting-random-number generating unit 51 generates a random number sequence by cyclic-driving the same initial value generated by this key based on the vertical and horizontal control pulses of the video signal and the pixel clocks of the video signal. At this time, the generated random number sequence is the same as that generated by the encrypting-random-number generating unit 41 in the transmitter side.

In step S103, the decrypting-random-number generating unit 51 decrypts the encrypted frame number Tx based on the random number sequence generated in step S102 and sets the value as the frame number Rx. The encrypted frame number Tx is decrypted based on the random number sequence generated by the decrypting-random-number generating unit 51 so as to be the frame number Rx in the receiver side (display device 12).

In step S104, the decrypting-random-number generating unit 51 supplies the unencrypted frame number Tx, the frame number Rx generated in step S103, and the H/V control signal to the correcting unit 33.

In step S105, the decrypting-random-number generating unit 51 supplies the random number sequence generated in step S102 to the exclusive-OR circuit 52.

Figure 5:
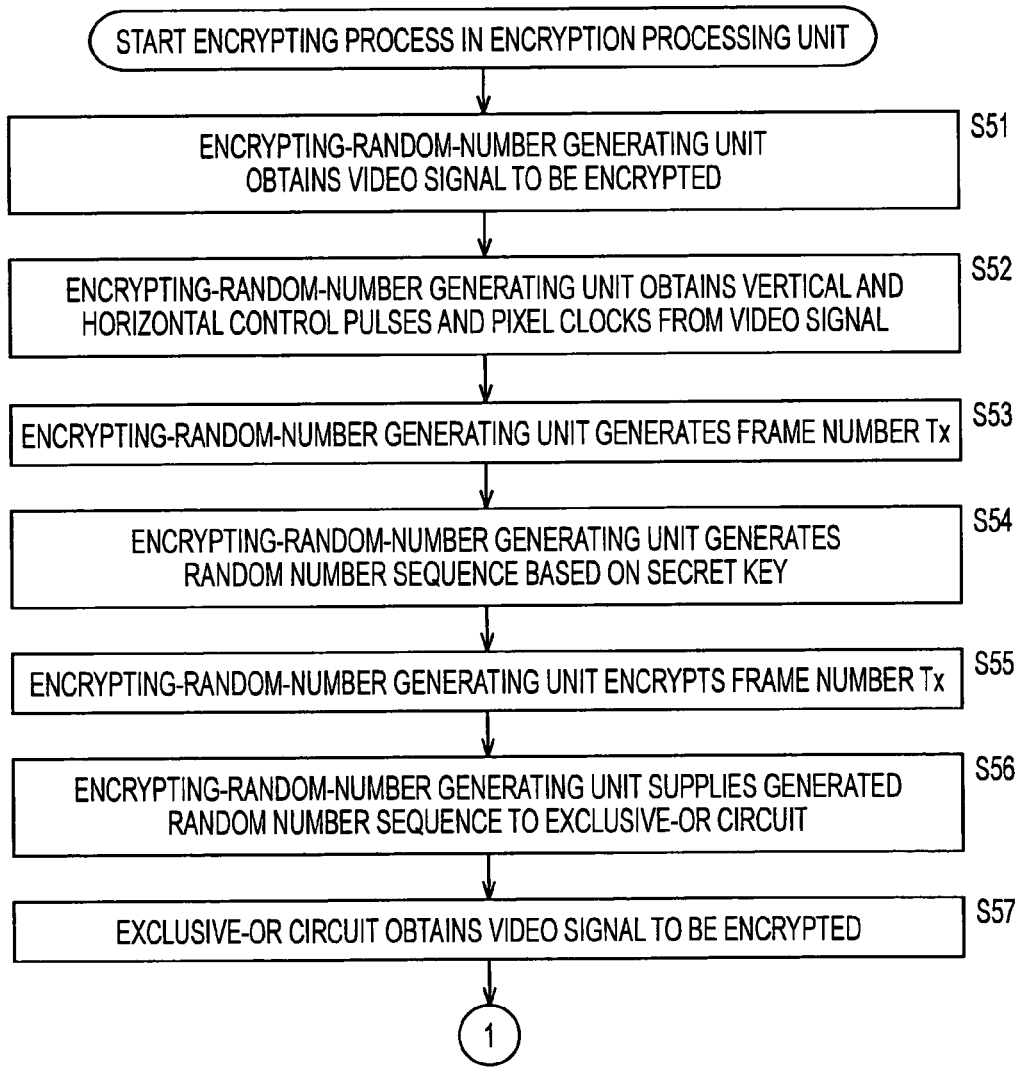
FIG. 5 is a flowchart for illustrating an encrypting process in the encryption processing unit shown in FIG. 4.

In step S106, the exclusive-OR circuit 52 obtains the encrypted video signal supplied from the exclusive-OR circuit 42 of the encryption processing unit 22 (step S60 in FIG. 5).

In step S107, the exclusive-OR circuit 52 operates the exclusive OR of the encrypted video signal and the random number sequence supplied from the decrypting-random-number generating unit 51 (random number sequence generated in step S102) so as to decrypt the bit information of the encrypted video signal (since the random number sequence generated by the encrypting-random-number generating unit 41 is the same as that generated by the decrypting-random-number generating unit 51, the video signal before being encrypted can be reproduced). Accordingly, the encrypted data can be decrypted. The exclusive-OR circuit 52 transmits the decrypted video signal to the video-signal processing unit 34.

In step S108, the decrypting-random-number generating unit 51 judges whether or not a load pulse has been transmitted thereto from the correcting unit 33. The correcting unit 33 judges whether or not a load pulse need be generated based on the frame numbers Tx and Rx, which have been transmitted by the decrypting-random-number generating unit 51 (step S104). If the correcting unit 33 has judged that a load pulse need be generated (if the judgment in step S7 in FIG. 2 is YES), the correcting unit 33 generates a load pulse and transmits it to the decrypting-random-number generating unit 51 and the encrypting-random-number generating unit 41 (step S9 in FIG. 2). If it has been judged that the load pulse has been transmitted, the process proceeds to step S109, where the decrypting-random-number generating unit 51 resets an LFSR module 301, which will be described later. If it has been judged that the load pulse has not been transmitted in step S108, step S109 is skipped. The above-described process is continued until all video signals have been decrypted.

Figure 7:
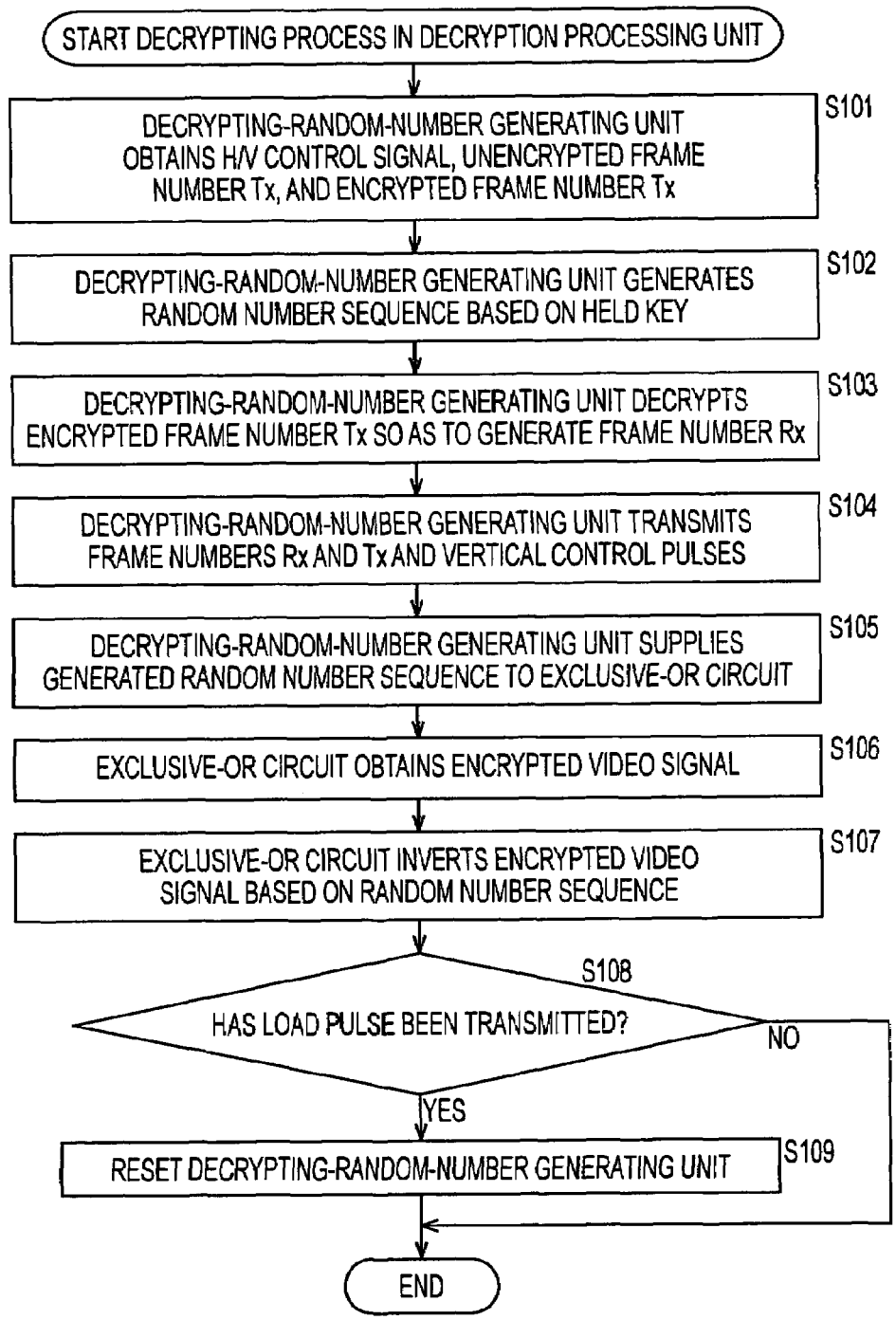
FIG. 7 is a flowchart for illustrating a decrypting process in the decryption processing unit shown in FIG. 4.

Even if loss of synchronization occurs, the encrypting-random-number generating unit 41 and the decrypting-random-number generating unit 51 are reset by the load pulse by performing the processes shown in FIGS. 5 to 7, and thus the loss of synchronization can be immediately overcome.

Next, a principle structure of a linear feedback shift register (LFSR), which is included in the encrypting-random-number generating unit 41 and the decrypting-random-number generating unit 51 for generating a random number sequence, will be described with reference to FIG. 8.

Figure 8:
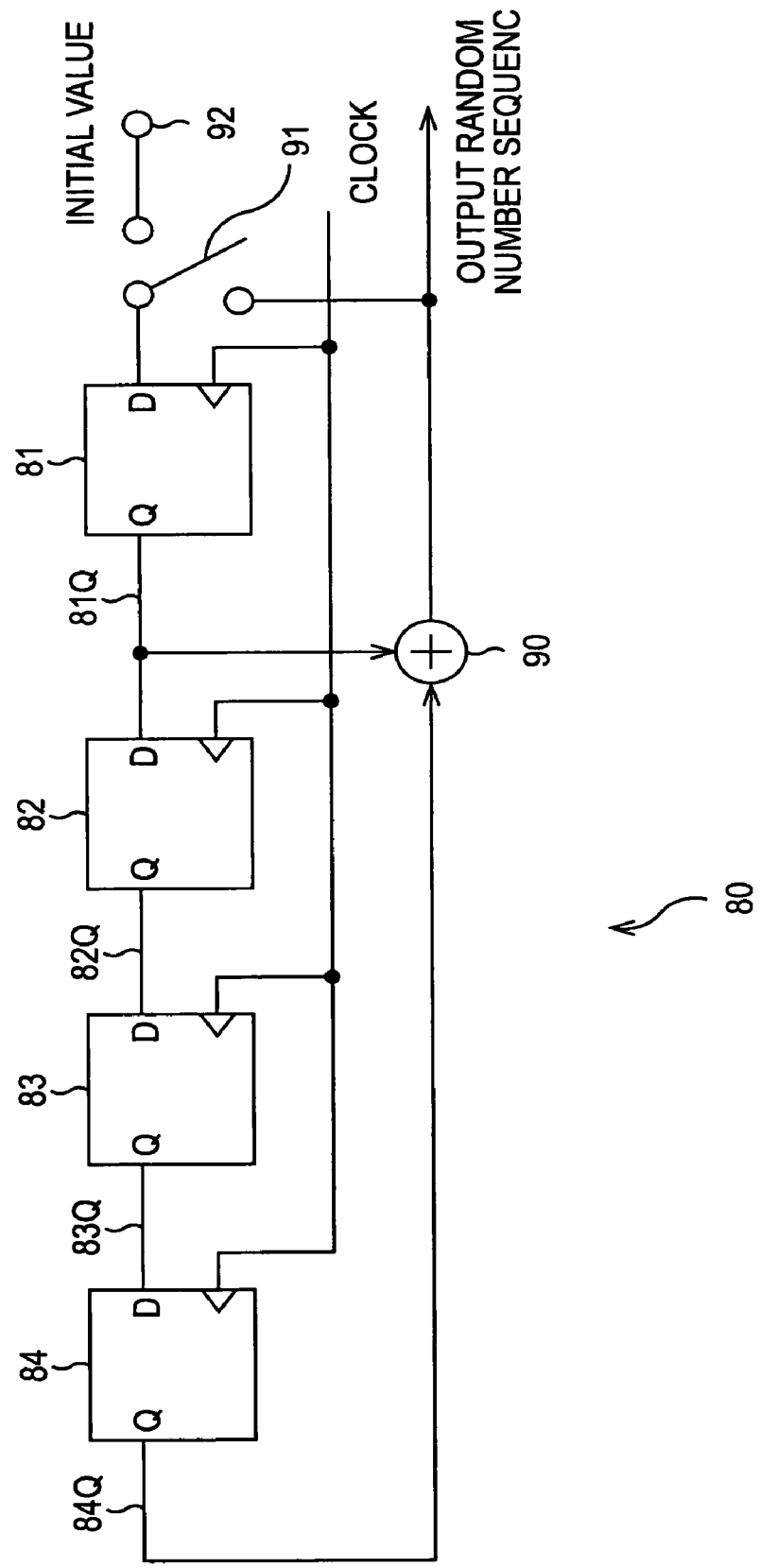
FIG. 8 is a block diagram showing a principle structure of an LFSR.

An LFSR 80 shown in FIG. 8 includes flip-flops 81 to 84 and an exclusive-OR circuit 90. The flip-flops 81 to 84 are cascaded so that each output is supplied to the subsequent stage. An output 81Q of the flip-flop 81 and an output 84Q of the flip-flop 84 are input to the exclusive-OR circuit 90. Further, the output of the exclusive-OR circuit 90 is output as a random number sequence and is input to the flip-flop 81 through a switch 91.

The LFSR 80 is a circuit for generating random numbers of the M-series (linear maximum periodic sequence). For example, as shown in FIG. 8, when random numbers of 4 bits are to be generated, first (flip-flop 81) and fourth (flip-flop 84) latch outputs are allowed to be input to the exclusive-OR circuit 90. Accordingly, a random number sequence of the fourth power of 2 based on an expression $x^4+x+1$, that is, a random number sequence of a 15-clock cycle can be generated. FIG. 9 shows a random number sequence output from each flip-flop (flip-flops 81 to 84) of the LFSR 80 at this time.

In FIG. 9, the vertical axis indicates the number of clocks and the horizontal axis indicates the output of each flip-flop. That is, 81Q is the output of the flip-flop 81, 82Q is the output of the flip-flop 82, 83Q is the output of the flip-flop 83, and 84Q is the output of the flip-flop 84. The values of all the 81Q to 84Q are set to 1 at reset. Then, every time a clock is input, 81Q to 84Q of the flip-flops 81 to 84 output the values shown in FIG. 9.

The value output from the exclusive-OR circuit 90 every time a clock is input becomes a random number. The value is latched by the flip-flop 81 and then sequentially transferred to the flip-flops 82 to 84 in the subsequent stages. Therefore, the output of each of the flip-flops 81 to 84 (for example, output 81Q of the flip-flop 81) forms a random number sequence. By increasing the number of stages of the latch circuit (flip-flops 81 to 84), the cycle of a random number sequence can be made longer. For example, when ten latch circuits (flip-flops) are used, random numbers of the tenth power of 2, that is, a 1023-clock cycle, can be generated.

In the LFSR 80, by switching the switch 91 to the side of a terminal 92 and inputting an initial value through the terminal 92, an arbitrary initial value can be set to the flip-flops 81 to 84.

By using a set/reset-type latch circuit as the flip-flops 81 to 84, an initial value of an arbitrary random number sequence can be loaded. Accordingly, an output random number sequence starting at arbitrary timing in one cycle can be generated.

Figure 10:
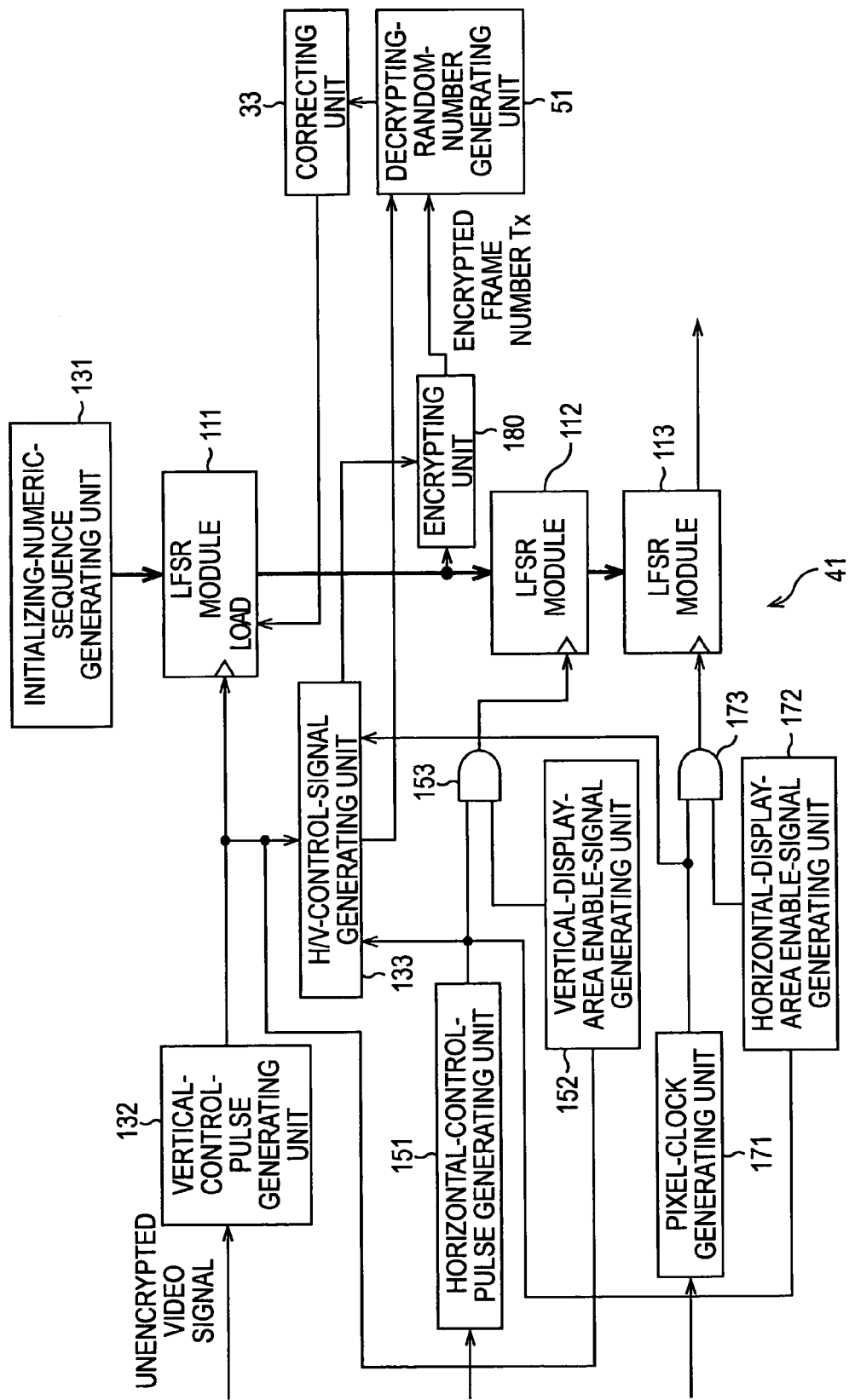
FIG. 10 is a block diagram showing a basic configuration of an encrypting-random-number generating unit shown in FIG. 4.

FIG. 10 shows a basic configuration of the encrypting-random-number generating unit 41. Actually, the encrypting-random-number generating unit 41 shuffles various bits so as to generate more random numbers, but the description thereof will be omitted.

The encrypting-random-number generating unit 41 includes a plurality of LFSR modules, each having an LFSR of the configuration shown in FIG. 8 (in the example shown in FIG. 10, three LFSR modules 111, 112, and 113 are provided). Upon receiving a load pulse from the correcting unit 33 (when judgment in step S61 in FIG. 6 is YES), the LFSR module 111 loads an initial value supplied from an initializing-numeric-sequence generating unit 131 (reset). After that, the LFSR module 111 generates a numeric sequence (random numbers) every time a vertical control pulse is input thereto as a clock according to a frame cycle from a vertical-control-pulse generating unit 132, and supplies the numeric sequence as an initial value to the LFSR module 112 and an encrypting unit 180.

The LFSR module 112 generates a numeric sequence (random numbers) by using the numeric sequence supplied from the LFSR module 111 as an initial value every time a horizontal control pulse is input as a clock according to a horizontal scanning cycle from a horizontal-control-pulse generating unit 151, and supplies the numeric sequence as an initial value to the LFSR module 113. An AND circuit 153 is brought into conduction when an enable signal is input thereto from a vertical-display-area enable-signal generating unit 152, and supplies horizontal control pulses generated by the horizontal-control-pulse generating unit 151 to the LFSR module 112.

The LFSR module 113 generates a numeric sequence (random numbers) by using the numeric sequence supplied from the LFSR module 112 as an initial value every time a pixel clock is input from a pixel-clock generating unit 171 through an AND circuit 173 according to a pixel cycle, and outputs the numeric sequence to the exclusive-OR circuit 42.

The AND circuit 173 is brought into conduction when an enable signal is input thereto from a horizontal-display-area enable-signal generating unit 172, and supplies the pixel clocks output from the pixel-clock generating unit 171 to the LFSR module 113.

The vertical-control-pulse generating unit 132 generates vertical control pulses in synchronization with a vertical synchronizing signal included in the video signal input from the DTV tuner 21 (video signal to be transmitted). The vertical control pulses generated by the vertical-control-pulse generating unit 132 are supplied to the LFSR module 111, and are also input to an H/V-control-signal generating unit 133 and the vertical-display-area enable-signal generating unit 152.

The H/V-control-signal generating unit 133 counts the vertical control pulses supplied from the vertical-control-pulse generating unit 132, with 128 frames being one cycle, so as to calculate the frame number Tx (any value from 1 to 128). Also, the H/V-control-signal generating unit 133 combines the vertical control pulses, the horizontal control pulses generated by the horizontal-control-pulse generating unit 151, and the pixel clocks generated by the pixel-clock generating unit 171, so as to generate an H/V control signal. The H/V-control-signal generating unit 133 supplies the generated frame number Tx and the H/V control signal to the correcting unit 33 and also supplies the frame number Tx to the encrypting unit 180.

The encrypting unit 180 encrypts the frame number Tx supplied from the H/V-control-signal generating unit 133 based on a numeric sequence supplied for each frame from the LFSR module 111, and supplies the encrypted frame number Tx to the correcting unit 33.

The vertical-display-area enable-signal generating unit 152 generates a vertical-display-area enable signal corresponding to an effective vertical display area based on the vertical control pulses supplied from the vertical-control-pulse generating unit 132, and supplies the enable signal to the AND circuit 153. The horizontal-control-pulse generating unit 151 generates horizontal control pulses in synchronization with a horizontal synchronizing signal included in the video signal input from the DTV tuner 21 (video signal to be transmitted). The horizontal control pulses generated by the horizontal-control-pulse generating unit 151 are supplied to the LFSR module 112 through the AND circuit 153 and are also input to the H/V-control-signal generating unit 133 and the horizontal-display-area enable-signal generating unit 172.

The horizontal-display-area enable-signal generating unit 172 generates a horizontal-display-area enable signal corresponding to an effective horizontal display area based on the horizontal control pulses and supplies the enable signal to the AND circuit 173. The pixel-clock generating unit 171 generates pixel clocks in synchronization with the vertical and horizontal synchronizing signals included in the video signal input from the DTV tuner 21 (video signal to be transmitted).

Accordingly, vertical control pulses, horizontal control pulses, and pixel clocks are generated based on the same video signal input from the DTV tuner 21. Therefore, all of the vertical control pulses, horizontal control pulses, and pixel clocks can be synchronized, and thus the random-number sequence generated by the LFSR module 113 can be synchronized with this video signal.

Next, a random-number generating process performed by the encrypting-random-number generating unit 41 shown in FIG. 10 will be described with reference to the flowchart shown in FIGS. 11 and 12. This flowchart is for specifically explaining steps S51 to S56 in FIG. 5. This process is started when a video signal to be encrypted is input to the encrypting-random-number generating unit 41 (after step S1 or S3 in FIG. 2).

In step S151, the vertical-control-pulse generating unit 132 generates vertical control pulses in synchronization with a vertical synchronizing signal included in the video signal input from the DTV tuner 21 (video signal to be transmitted). The vertical-control-pulse generating unit 132 supplies the generated vertical control pulses to the LFSR module 111, the H/V-control-signal generating unit 133, and the vertical-display-area enable-signal generating unit 152.

In step S152, the horizontal-control-pulse generating unit 151 generates horizontal control pulses in synchronization with a horizontal synchronizing signal included in the video signal input from the DTV tuner 21 (video signal to be transmitted). The horizontal-control-pulse generating unit 151 supplies the generated horizontal control pulses to the AND circuit 153, the H/V-control-signal generating unit 133, and the horizontal-display-area enable-signal generating unit 172.

In step S153, the pixel-clock generating unit 171 generates pixel clocks so as to synchronize with a pixel signal included in the video signal input from the DTV tuner 21 (video signal to be transmitted).

In step S154, the H/V-control-signal generating unit 133 counts the vertical control pulses, which have been supplied from the vertical-control-pulse generating unit 132 in step S151, with 128 frames being one cycle, so as to calculate the frame number Tx. Also, the H/V-control-signal generating unit 133 combines the vertical control pulses, horizontal control pulses, and pixel clocks so as to generate an H/V control signal. Then, the H/V-control-signal generating unit 133 transmits the calculated frame number Tx and the H/V control signal to the decrypting-random-number generating unit 51 of the decryption processing unit 32 and also transmits the frame number Tx to the encrypting unit 180. The frame number Tx is further supplied from the decrypting-random-number generating unit 51 to the correcting unit 33.

In step S155, the LFSR module 111 receives a load pulse from the correcting unit 33. The correcting unit 33 generates a load pulse when the frame number, which has been calculated by counting the vertical control pulses with 128 frames being one cycle, is returned from 128 to 1 (after a lapse of one cycle (about two seconds)), or when the transmitter and receiver sides go out of synchronization, and supplies the load pulse to the LFSR module 111 (step S210 in FIG. 14, which will be described later). At the beginning of the random-number generating process, a load pulse is input without exception.

In step S156, the initializing-numeric-sequence generating unit 131 generates an initializing numeric sequence based on the secret key set in advance in the encrypting-random-number generating unit 41, and supplies the numeric sequence to the LFSR module 111.

In step S157, the LFSR module 111 loads the initial value supplied from the initializing-numeric-sequence generating unit 131 (step S156) when the load pulse is input from the correcting unit 33 in step S155.

In step S158, the LFSR module 111 generates a numeric sequence (random numbers) based on the initial value loaded in step S157. After that, the LFSR module 111 generates a numeric sequence (random number) every time a vertical control pulse is input as a clock according to a frame cycle from the vertical-control-pulse generating unit 132. In this case, a numeric sequence is generated for each frame.

In step S159, the LFSR module 111 supplies the generated numeric sequences to the LFSR module 112 and to the encrypting unit 180.

In step S160, the encrypting unit 180 obtains the numeric sequences supplied from the LFSR module 111 (step S159) and the frame number Tx supplied from the H/V-control-signal generating unit 133 (step S154), and encrypts the frame number Tx based on the numeric sequences. The encrypting unit 180 transmits the encrypted frame number Tx to the correcting unit 33.

In step S161, the vertical-display-area enable-signal generating unit 152 generates a vertical-display-area enable signal based on the vertical control pulses supplied from the vertical-control-pulse generating unit 132 in step S151. Specifically, it is judged whether or not a target line is in an effective vertical display area based on the position of the input vertical control pulse. If the target line is in the vertical display area, a signal of logic H (1) is output. If the target line is not in the vertical display area, a signal of logic L (0) is output. The vertical-display-area enable-signal generating unit 152 supplies the generated vertical-display-area enable signal to the AND circuit 153.

In step S162, the AND circuit 153 is brought into conduction if the vertical-display-area enable signal supplied from the vertical-display-area enable-signal generating unit 152 is logic H (1), and becomes out of conduction if the enable signal is logic L (0). That is, the AND circuit 153 is brought into conduction when the enable signal (logic H (1)) is input thereto from the vertical-display-area enable-signal generating unit 152, and supplies the horizontal control pulses generated by the horizontal-control-pulse generating unit 151 (step S152) to the LFSR module 112. The AND circuit 153 becomes out of conduction when an AND-enable signal (enable signal of logic L (0)) is input thereto, so that the horizontal control pulses are not allowed to be output to the LFSR module 112.

In step S163, the LFSR module 112 generates a numeric sequence (random numbers) by using the numeric sequence supplied from the LFSR module 111 (step S159) as an initial value when the horizontal control pulse is input as a clock from the horizontal-control-pulse generating unit 151 (step S152). After that, the LFSR module 112 generates a numeric sequence (random numbers) every time a horizontal control pulse is input as a clock from the horizontal-control-pulse generating unit 151. In this case, a numeric sequence is generated for each line.

In step S164, the LFSR module 112 supplies the generated numeric sequences to the LFSR module 113.

In step S165, the horizontal-display-area enable-signal generating unit 172 generates a horizontal-display-area enable signal based on the horizontal control pulses supplied from the horizontal-control-pulse generating unit 151 in step S152. Specifically, a signal of H (1) is output at timing in an effective horizontal display area based on the position of the input horizontal control pulse, and a signal of L (0) is output at timing out of an effective horizontal display area. The horizontal-display-area enable-signal generating unit 172 supplies the generated horizontal-display-area enable signal to the AND circuit 173.

In step S166, the AND circuit 173 is brought into conduction based on the horizontal-display-area enable signal supplied from the horizontal-display-area enable-signal generating unit 172. That is, the AND circuit 173 is brought into conduction when an enable signal (logic H (1)) is input thereto from the horizontal-display-area enable-signal generating unit 172, and supplies the pixel clocks generated by the pixel-clock generating unit 171 (step S153) to the LFSR module 113. When an AND-enable signal (enable signal of logic L (0)) is input, the AND circuit 173 becomes out of conduction, so that the pixel clocks are not supplied to the LFSR module 113.

In step S167, the LFSR module 113 generates a numeric sequence (random numbers) by using the numeric sequence supplied from the LFSR module 112 (step S164) as an initial value when a pixel clock is input as a clock from the pixel-clock generating unit 171 (steps S153 and S166). After that, the LFSR module 113 generates a numeric sequence (random numbers) every time a pixel clock is input as a clock from the pixel-clock generating unit 171. In this case, a numeric sequence is generated for each pixel.

In step S168, the LFSR module 113 outputs the generated numeric sequences (random numbers) to the exclusive-OR circuit 42.

In this way, the LFSR module 113 generates a numeric sequence (random numbers) every time a pixel clock is input as a clock from the pixel-clock generating unit 171. The initial value at this time, that is, the numeric sequence of the pixel at the left end (head) of each line, is set based on the numeric sequence (random numbers) output from the LFSR module 112. After the LFSR module 113 has generated numeric sequences for a line based on the pixel clocks from the pixel-clock generating unit 171, the initial value of the pixel at the left end (head) of the next line is input from the LFSR module 112. Accordingly, the LFSR module 113 generates a numeric sequence every time a pixel clock is input as a clock from the pixel-clock generating unit 171.

After the LFSR module 112 has generated the numeric sequence at the left end (head) of each line of one frame based on the horizontal control pulses from the horizontal-control-pulse generating unit 151, the initial value of a first line (head) of the next frame is input from the LFSR module 111. Based on the initial value, the LFSR module 112 generates a numeric sequence every time a horizontal control pulse is input as a clock from the horizontal-control-pulse generating unit 151.

The LFSR module 111 generates a numeric sequence (random numbers) every time a vertical control pulse is input as a clock from the vertical-control-pulse generating unit 132 by using the value output from the initializing-numeric-sequence generating unit 131 as an initial value. Then, when the transmitter side and the receiver side go out of synchronization (when frame number Tx is different from frame number Rx), or every 128 frames, the LFSR module 111 receives a load pulse from the correcting unit 33. Accordingly, the LFSR module 111 loads the initial value supplied from the initializing-numeric-sequence generating unit 131 again.

In this way, an initial value is set for every line, every frame, or every 128 frames, and random numbers are initialized for every line, every frame, or every 128 frames. Therefore, an error can be prevented from being propagated to the subsequence stage. Further, when an error is caused in a generated random number, an initializing (resetting) load pulse (extra load pulse, not for every 128 frames) is generated by the correcting unit 33 and the random number is initialized. Thus, an error can be prevented from being caused even if 128 frames have not been elapsed after the previous initialization.

In the encrypting-random-number generating unit 41 in the transmitter side (transmitter 11), a random number sequence is updated at the starting point of every line, the starting point of every frame, and every 128 frames. Likewise, the decrypting-random-number generating unit 51 in the receiver side performs synchronization at the starting point of every line, the starting point of every frame, and every 128 frames accordingly, so as to generate a random number sequence identical to that in encryption. Further, the load pulse from the correcting unit 33 is supplied to the encrypting-random-number generating unit 41 in the transmitter side and the decrypting-random-number generating unit 51 in the receiver side. Therefore, the encrypting-random-number generating unit 41 and the decrypting-random-number generating unit 51 in the receiver side generate the same random number sequence. The configuration of the correcting unit 33 will be described later with reference to FIG. 14.

As described above, the encrypted video signal output from the exclusive-OR circuit 42 in the transmitter side (transmitter 11) is received by the exclusive-OR circuit 52 in the receiver side (display device 12). Also, the H/V control signal including vertical control pulses, horizontal control pulses, and pixel clocks; the unencrypted frame number Tx; and the encrypted frame number Tx, which have been output from the encrypting-random-number generating unit 41 in the transmitter side, are received by the decrypting-random-number generating unit 51 in the receiver side. The decrypting-random-number generating unit 51 decrypts the encrypted frame number Tx so as to generate a frame number Rx in the receiver side. The decrypting-random-number generating unit 51 supplies the frame number Rx in the receiver side, the vertical control pulses, and the frame number Tx in the transmitter side to the correcting unit 33. The correcting unit 33 generates a load pulse as necessary and supplies the load pulse to the decrypting-random-number generating unit 51 (and the encrypting-random-number generating unit 41).

Figure 13:
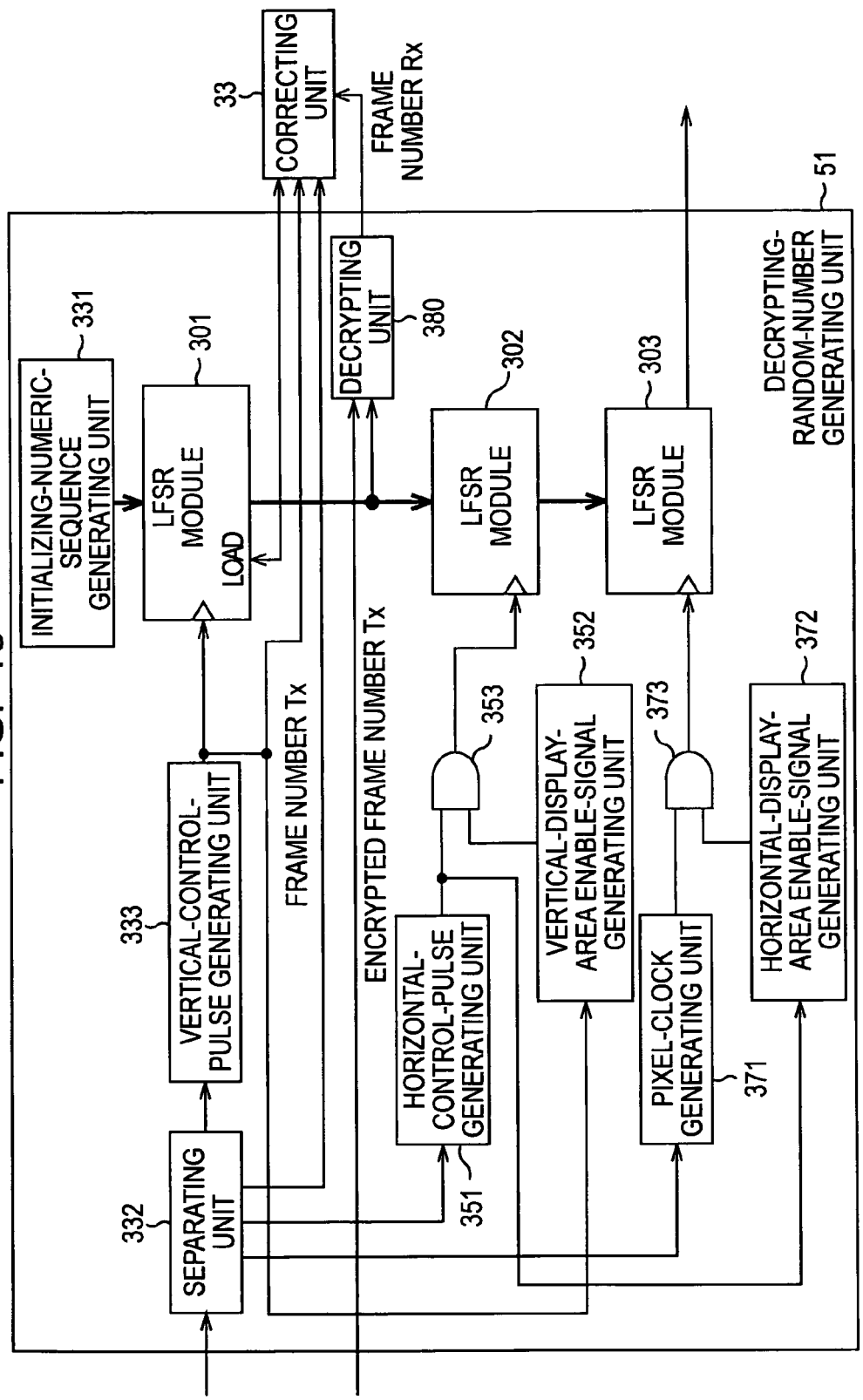
FIG. 13 is a block diagram showing a basic configuration of a decrypting-random-number generating unit shown in FIG. 4.

FIG. 13 shows a basic configuration of the decrypting-random-number generating unit 51. As is clear by comparing FIG. 13 with FIG. 10, the decrypting-random-number generating unit 51 shown in FIG. 13 has basically the same configuration as that of the encrypting-random-number generating unit 41 shown in FIG. 10.

That is, the decrypting-random-number generating unit 51 includes an initializing-numeric-sequence generating unit 331, LFSR modules 301 to 303, a horizontal-control-pulse generating unit 351, a vertical-display-area enable-signal generating unit 352, a pixel-clock generating unit 371, a horizontal-display-area enable-signal generating unit 372, AND circuits 353 and 373, and an decrypting unit 380, corresponding to the initializing-numeric-sequence generating unit 131, the LFSR modules 111 to 113, the horizontal-control-pulse generating unit 151, the vertical-display-area enable-signal generating unit 152, the pixel-clock generating unit 171, the horizontal-display-area enable-signal generating unit 172, the AND circuits 153 and 173, and the encrypting unit 180 of the encrypting-random-number generating unit 41 shown in FIG. 10. Each unit of a corresponding name has a corresponding function.

However, a generating unit corresponding to the H/V-control-signal generating unit 133 of the encrypting-random-number generating unit 41 is not necessary, and is not provided in the decrypting-random-number generating unit 51 shown in FIG. 13. The encrypting unit 180 of the encrypting-random-number generating unit 41 encrypts the frame number Tx based on a random number sequence from the LFSR module 111, whereas the decrypting unit 380 of the decrypting-random-number generating unit 51 decrypts the frame number Tx based on a random number sequence from the LFSR module 301. Further, the decrypting-random-number generating unit 51 includes a separating unit 332 for separating the H/V control signal, which has been supplied form the H/V-control-signal generating unit 133 of the encrypting-random-number generating unit 41, into vertical control pulses, horizontal control pulses, and pixel clocks. The separating unit 332 outputs the vertical control pulses to the vertical-control-signal generating unit 333, outputs the horizontal control pulses to the horizontal-control-pulse generating unit 351, and outputs the pixel clocks to the pixel-clock generating unit 371, so that vertical synchronizing pulses, horizontal control pulses, or pixel clocks in the receiver side are generated. Also, the separating unit 332 separates the frame number Tx and outputs it to the correcting unit 33.

Figure 11:
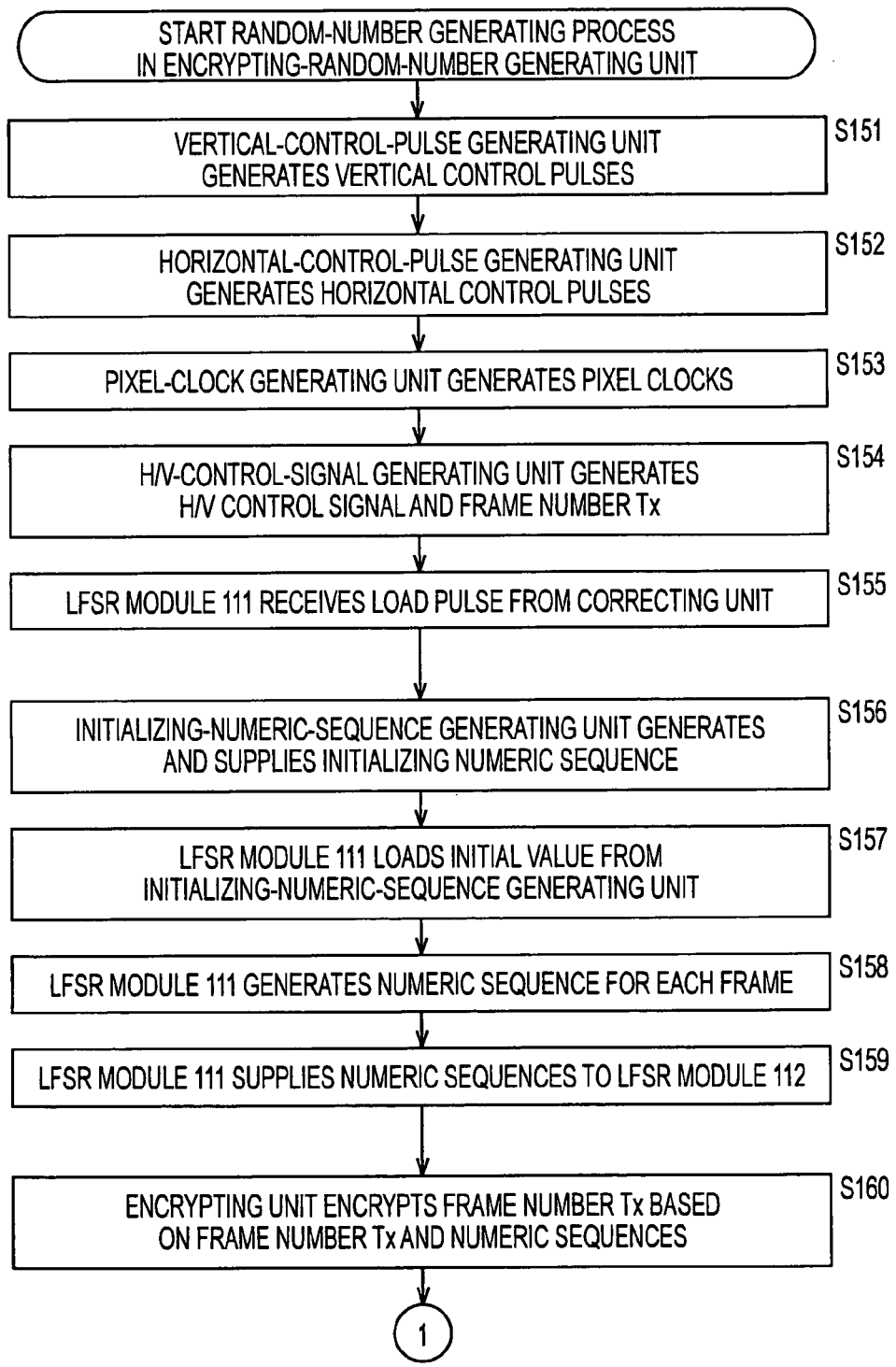
FIG. 11 is a flowchart for illustrating a random-number generating process in the encrypting-random-number generating unit shown in FIG. 10.
Figure 12:
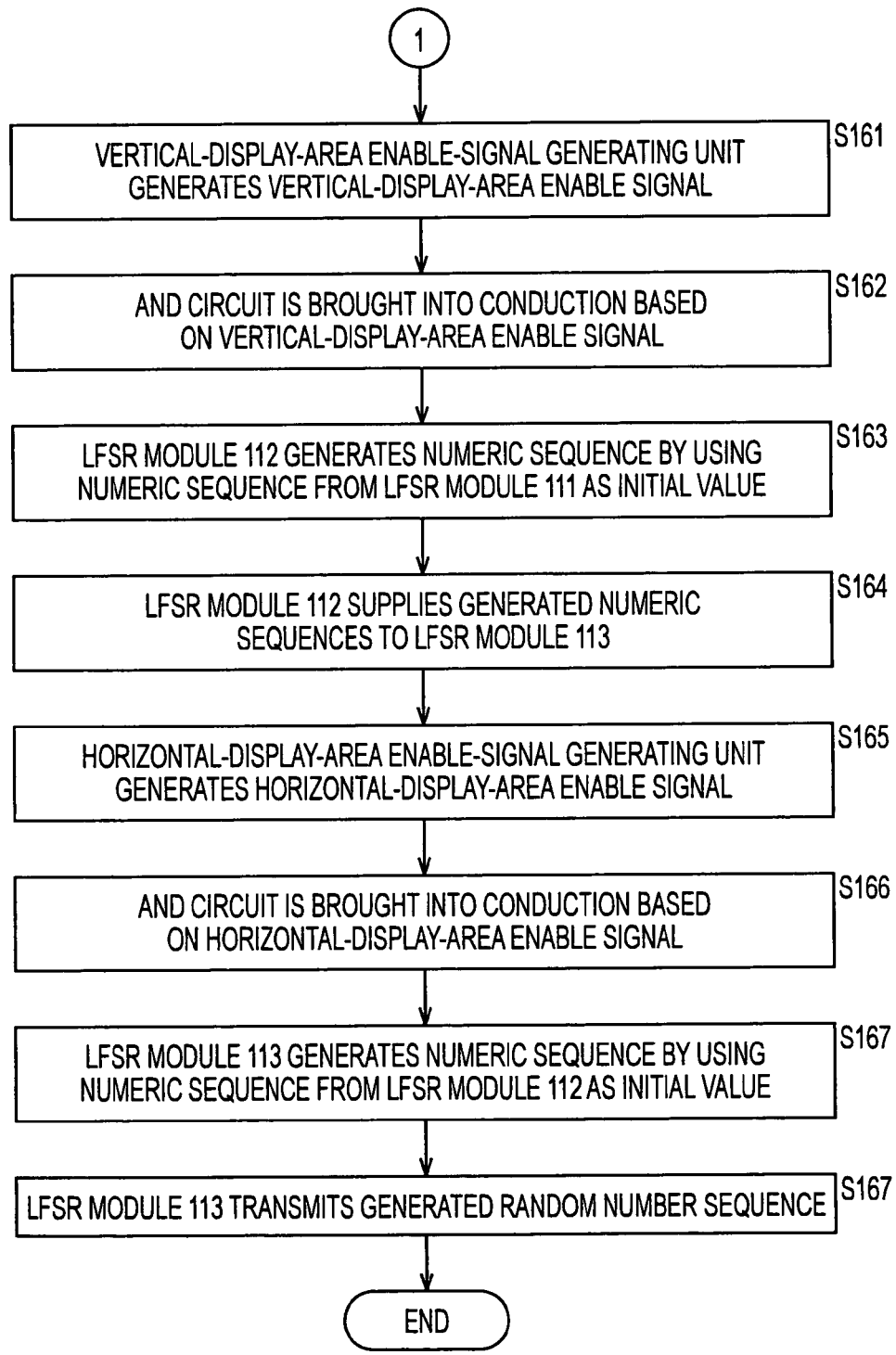
FIG. 12 is a flowchart for illustrating the random-number generating process in the encrypting-random-number generating unit shown in FIG. 10.

A decrypting-random-number generating process in the decrypting-random-number generating unit 51 shown in FIG. 13 is the same as the above-described flowchart shown in FIGS. 11 and 12, and the corresponding description will be omitted. However, in step S151, the generated vertical control pulses are output to the correcting unit 33, not to the H/V-control-signal generating unit 133. In step S154, generation and transmission of the H/V control signal and the frame number Tx are not performed by the H/V-control-signal generating unit 133. Instead, the separating unit 332 outputs the separated frame number Tx to the correcting unit 33. Also, the process of encrypting the frame number Tx performed by the encrypting unit 180 in step S160 is replaced by a process of generating a frame number Rx by decrypting the encrypted frame number Tx and of outputting the frame number Rx to the correcting unit 33 performed by the decrypting unit 380.

Figure 14:
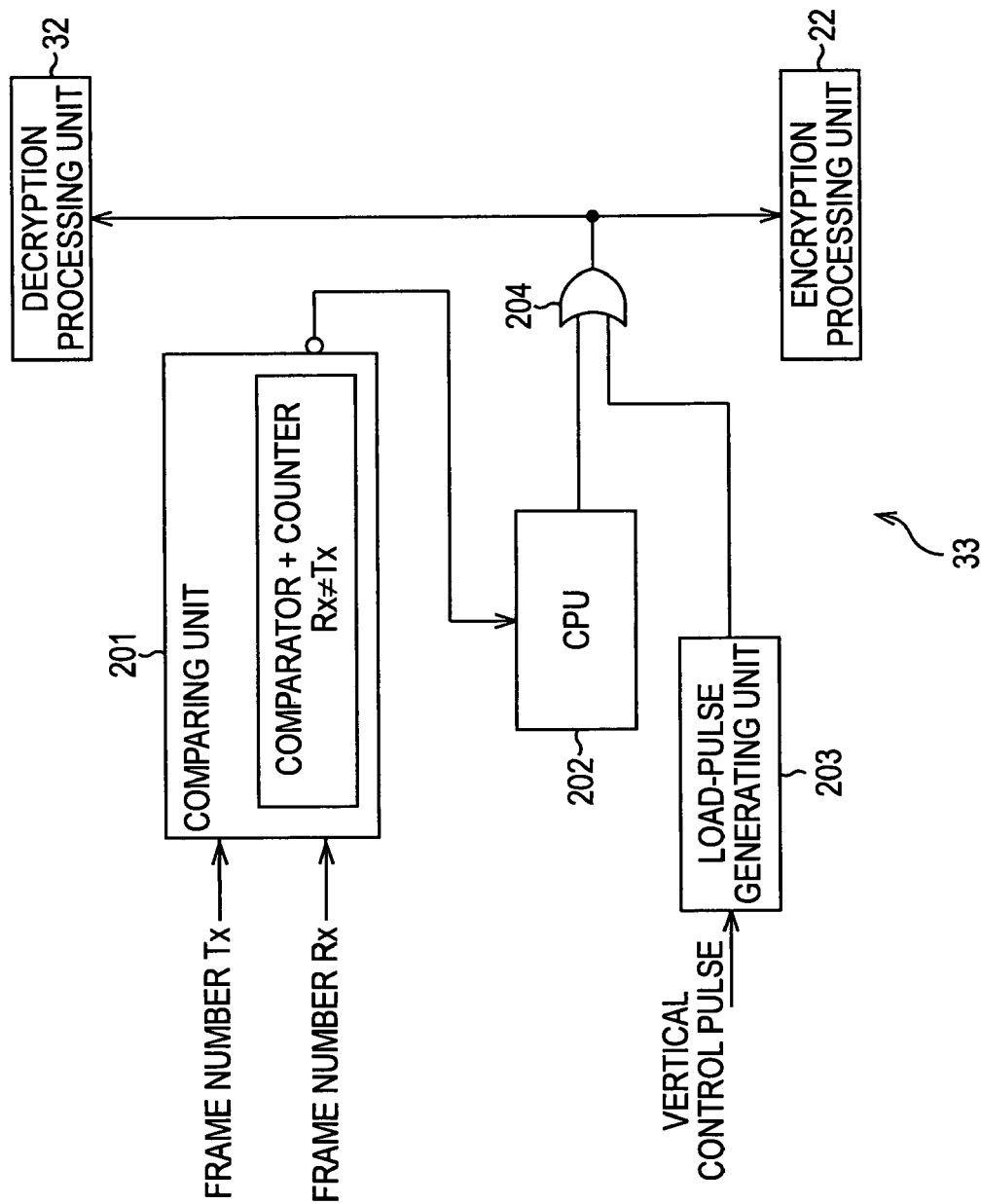
FIG. 14 is a block diagram showing an example of the configuration of a correcting unit shown in FIG. 1.

FIG. 14 shows a specific configuration of the correcting unit 33 shown in FIG. 1.

A comparing unit 201 has functions of a comparator and a counter. The comparing unit 201 compares the frame number Tx and the frame number Rx, which have been output from the encrypting-random-number generating unit 41 and supplied through the decrypting-random-number generating unit 51 (steps S154 and S160 in FIG. 11 and a corresponding process performed by the decrypting-random-number generating unit 51). When Tx and Rx do not match with each other, the comparing unit 201 counts the number of times. The count is reset when the frame number Tx matches with the frame number Rx (that is, the number of times is counted only when the frame numbers do not match successively). When the values of the frame numbers Tx and Rx do not match with each other 16 consecutive times, the comparing unit 201 judges that the transmitter side and the receiver side are out of synchronization, and transmits a control signal of logic L (0) to a CPU 202.

Upon receiving the control signal of logic L (0) from the comparing unit 201, the central processing unit (CPU) 202 generates a pseudo load pulse (that is, extra load pulse not for a 128-frame cycle) for resetting random number generation in the transmitter and receiver sides, and supplies the load pulse to an OR circuit 204.

A load-pulse generating unit 203 synchronizes with the vertical control pulses output from the encrypting-random-number generating unit 41 (step S151 in FIG. 11) so as to count the vertical control pulses output from the vertical-control-pulse generating unit 333 of the decrypting-random-number generating unit 51 (process corresponding to step S151 in FIG. 11), with 128 frames being one cycle. The load-pulse generating unit 203 generates a load pulse when the counted frame number returns from 128 to 1 (when one cycle (about two seconds) has elapsed), and supplies the load pulse to the OR circuit 204.

The OR circuit 204 supplies the pseudo load pulse supplied from the CPU 202 or the load pulse supplied from the load-pulse generating unit 203 to the encrypting-random-number generating unit 41 of the encryption processing unit 22 or 24 and to the decrypting-random-number generating unit 51 of the decryption processing unit 32 as a load pulse generated by the correcting unit 33.

Figure 15:
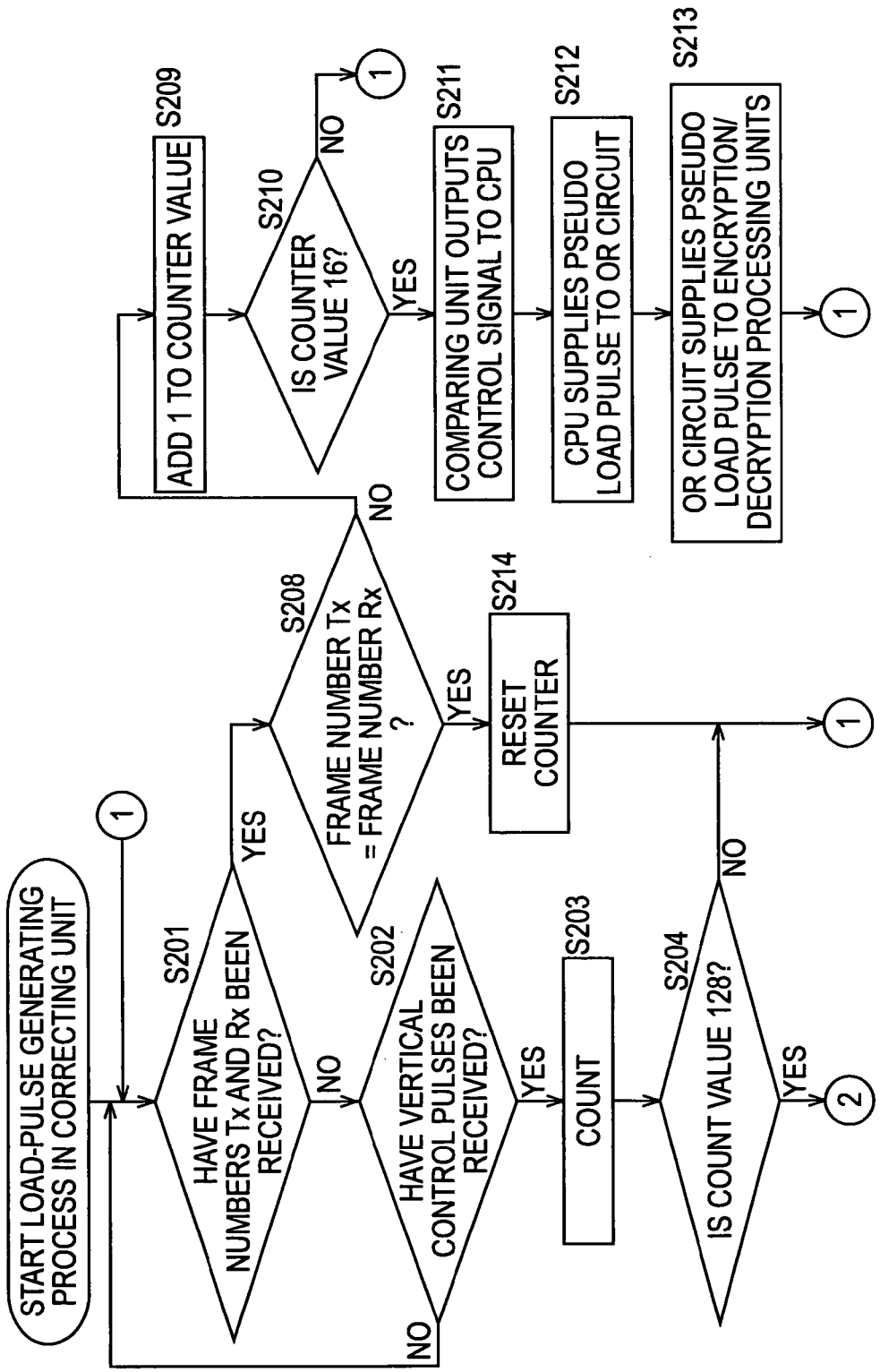
FIG. 15 is a flowchart for illustrating a load-pulse generating process in the correcting unit shown in FIG. 14.
Figure 16:
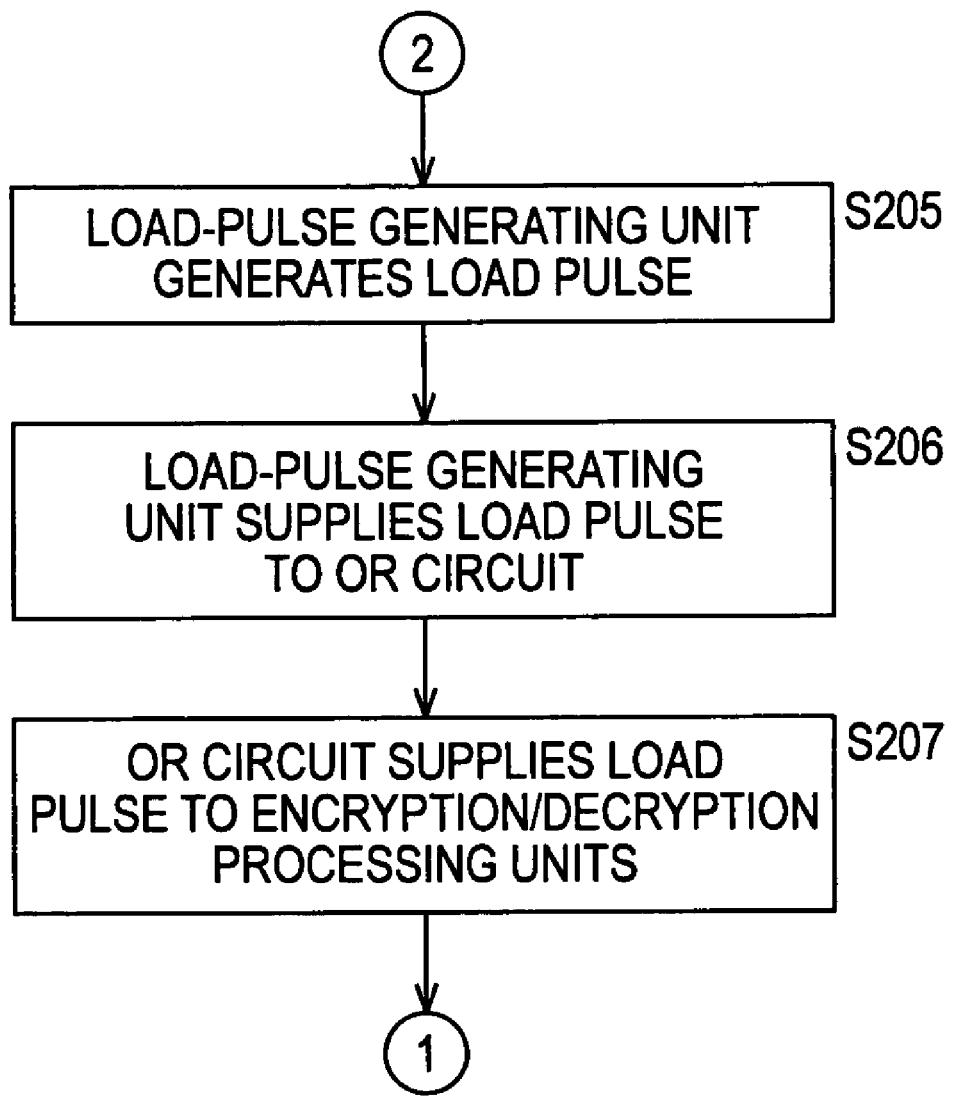
FIG. 16 is the flowchart for illustrating the load-pulse generating process in the correcting unit shown in FIG. 14.

Next, a load-pulse generating process performed by the correcting unit 33 shown in FIG. 14 will be described with reference to the flowchart shown in FIGS. 15 and 16. This flowchart is for specifically explaining steps S7 to S9 in FIG. 2. This process is started when the power of the apparatus is turned on.

In step S201, the comparing unit 201 judges whether or not it has received the frame number Tx and the frame number Rx (frame number Tx and frame number Rx supplied from the decrypting-random-number generating unit 51 in step S104 in FIG. 7). If the comparing unit 201 has judged that it has not received the frame number Tx and the frame number Rx, the process proceeds to step S202, where the load-pulse generating unit 203 judges whether or not it has received vertical control pulses. If the load-pulse generating unit 203 has judged that it has not received vertical control pulses, the process returns to step S201, and the process is repeated.

If it has been judged that the vertical control pulses have been received in step S202, the process proceeds to step S203, where the load-pulse generating unit 203 counts the vertical control pulses, with 128 frames being one cycle.

In step S204, the load-pulse generating unit 203 judges whether or not the counted value in step S203 is 128. If the count value is not 128, the process returns to step S201, and the process is repeated.

If it has been judged that the count value is 128, the process proceeds to step S205, where the load-pulse generating unit 203 generates a load pulse. That is, the load-pulse generating unit 203 counts the vertical control pulses with 128 frames being one cycle, and generates a load pulse when the counted frame number returns from 128 (about two seconds) to 1.

In step S206, the load-pulse generating unit 203 supplies the generated load pulse to the OR circuit 204.

In step S207, the OR circuit 204 supplies the load pulse supplied from the load-pulse generating unit 203 to the encryption processing unit 22 and the decryption processing unit 32. Then, the process returns to step S201 and the process is repeated.

If it has been judged that the frame number Tx and the frame number Rx have been received in step S201, the process proceeds to step S208, where the comparing unit 201 judges whether or not the received frame number Tx is equal to the frame number Rx. The frame number Tx can be obtained by counting the vertical synchronizing pulses by the H/V-control-signal generating unit 133 and is a value transmitted without being encrypted. The frame number Rx is obtained by decrypting in the decrypting unit 380 the value transmitted with being encrypted. Therefore, the frame number Tx and the frame number Rx normally match with each other.

However, when a channel is switched or when a reproduced video signal is switched, a synchronizing signal becomes discontinuous, and thus synchronization is disturbed. When synchronization is disturbed, encrypted data cannot be decrypted correctly. Therefore, when the frame number Tx is different from the frame number Rx, correct decryption cannot be performed (that is, synchronization is disturbed). Accordingly, by comparing the frame number Tx with the frame number Rx, it can be checked whether or not the transmitter side (transmitter 11) and the receiver side (display device 12) are out of synchronization.

If it has been judged that the frame number Tx is different from the frame number Rx in step S208, the process proceeds to step S209, where the comparing unit 201 adds 1 to the counter. In this case, the counter value becomes 1.

In step S210, the comparing unit 201 judges whether or not the counter value is 16. The counter value is increased every time the frame number Tx is different from the frame number Rx, and is reset when the frame number Tx matches with the frame number Rx (step S214 described later). Therefore, the counter value represents the number of successive mismatches between the frame number Tx and the frame number Rx. If it has been judged that the counter value is not 16, the process returns to step S201, and the process is repeated. That is, the process is repeated until the counter value reaches 16.

If it has been judged that the counter value is 16 in step S210 (if it has been judged that the frame number Tx does not match with the frame number Rx 16 consecutive times), it is judged that synchronization has been disturbed due to switching of channel or signal. Then, the comparing unit 201 outputs a control signal of logic L (0) to the CPU 202 in step S211.

If it is judged that synchronization has been disturbed immediately after the counter value becomes 1, loss of synchronization may be wrongly detected due to noise or the like. Therefore, it is judged that loss of synchronization has occurred when the mismatch is detected a plurality of times (in this case, 16 times).

If the CPU 202 has received the control signal from the comparing unit 201, the process proceeds to step S212, where the CPU 202 generates a pseudo load pulse (that is, extra load pulse not for a 128-frame cycle). Then, the CPU 202 supplies the generated pseudo load pulse to the OR circuit 204.

In step S213, the OR circuit 204 supplies the pseudo load pulse to the encryption processing unit 22 and the decryption processing unit 32. Then, the process returns to step S201, and the same process is repeated.

If it has been judged that the frame number Tx is equal to the frame number Rx in step S208, the process proceeds to step S214, where the comparing unit 201 resets the counter (sets the counter value at 0). For example, if the frame number Tx does not match with the frame number Rx three consecutive times (if the counter value is 3), the counter is reset when the frame number Tx matches with the frame number Rx. In this way, the counter indicates the number of successive mismatches between the frame number Tx and the frame number Rx. Then, the process returns to step S201.

By performing steps S209 to S213, if random number generation in the receiver side becomes slower than that in the transmitter side due to a dropout of a vertical synchronizing signal caused by poor contact at a connector portion, or if random number generation in the receiver side becomes faster than that in the transmitter side due to noise on a frame pulse, a pseudo load pulse (extra load pulse not for a 128-frame cycle) is generated so as to reset random number generation in the receiver side (decryption processing unit 32) and the transmitter side (encryption processing unit 22). Accordingly, loss of synchronization between the transmitter and receiver sides can be immediately recovered.

In the above-described processes, the transmitter side transmits the frame number Tx indicating the frame number of a video signal to be transmitted, the encrypted frame number Tx, and the H/V control signal including vertical control pulses, horizontal control pulses, and pixel clocks. The receiver side decrypts the encrypted frame number Tx so as to generate a frame number Rx in the receiver side and compares the frame numbers Tx and Rx so as to generate a pseudo load pulse as necessary. Accordingly, even if the transmitter and receiver sides go out of synchronization, this state can be immediately recovered.

Also, even if a count error is caused by disturbance noise such as electrostatic discharge (ESD) in a transmission line, synchronization between the encrypting-random-number generating unit 41 in the transmitter side and the decrypting-random-number generating unit 51 in the receiver side is automatically corrected, so that loss of synchronization between encryption and decryption can be prevented. Accordingly, a video-signal processing system for constantly performing stable decryption can be realized.

Further, since the random-number generating units (the encrypting-random-number generating unit 41 and the decrypting-random-number generating unit 51) are reset in a 128-frame cycle (since the load-pulse generating unit 203 counts vertical control pulses with 128 frames being one cycle and generates a load pulse when the counted frame number returns from 128 to 1), the encryption processing unit 22 can be periodically synchronized with the decryption processing unit 32. Therefore, while an encrypted video signal is being decrypted, an undecryptable state caused by loss of synchronization can be periodically recovered.

In the above-described example, a pseudo load pulse is generated when the frame number Tx does not match with the frame number Rx 16 consecutive times. However, the number of times may not be 16, but may be an arbitrary number of 2 or more.

The above-described series of processes may be performed by either hardware or software. In this case, the above-described processes are performed by a personal computer 600 shown in FIG. 17.

Figure 17:
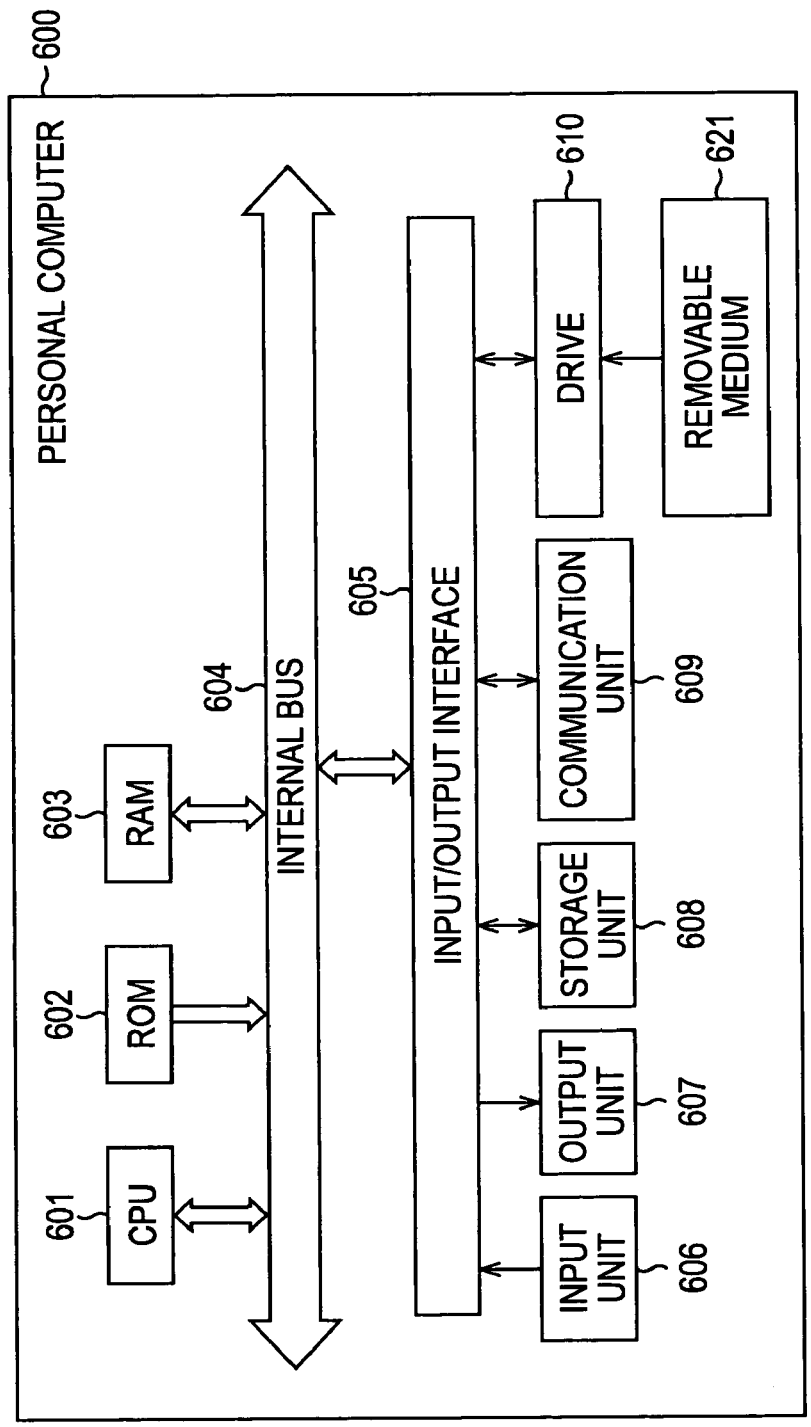
FIG. 17 is a block diagram showing an example of the configuration of a personal computer.

In FIG. 17, a central processing unit (CPU) 601 executes various processes according to a program stored in a read-only memory (ROM) 602 or a program loaded from a storage unit 608 to a random-access memory (RAM) 603. Also, data required by the CPU 601 for executing various processes is stored in the RAM 603 as necessary.

The CPU 601, the ROM 602, and the RAM 603 are mutually connected through an internal bus 604. An input/output interface 605 is connected to the internal bus 604.

An input unit 606 including a keyboard and a mouse; an output unit 607 including a display, such as a CRT or a liquid crystal display (LDC), and a speaker; the storage unit 608 including a hard disk; and a communication unit 609 including a modem and a terminal adaptor are connected to the input/output interface 605. The communication unit 609 performs a communicating process through various networks including a telephone line and CATV.

Also, a drive 610 is connected to the input/output interface 605 as necessary, and a removable medium 621, such as a magnetic disk, an optical disk, a magneto-optical disk, or a semiconductor memory, is loaded thereto. A computer program is read from the medium and is installed on the storage unit 608 as necessary.

When the series of processes are performed by software, a program constituting the software is installed through a network or a recording medium onto a computer incorporated into dedicated hardware or a multi-purpose personal computer which can perform various functions by installing various programs thereon.

The recording medium may be a package medium including the removable medium 621 which contains a program and which is distributed for providing a user with the program, as shown in FIG. 17. Alternatively, the recording medium may be a hard disk including the ROM 602 or the storage unit 608 containing a program, the hard disk being provided to a user while being incorporated into the main body of the apparatus.

In this description, steps describing a computer program may be performed in time series according to the described order. However, the steps may not necessarily be performed in time series, but may be performed in parallel or individually.

In this description, the system means an entire apparatus including a plurality of devices.

The invention claimed is:

1. A video-signal processing system for processing a video signal, comprising:
   encrypting means for encrypting the video signal and a first frame number, which indicates a frame number of the video signal to be transmitted, based on a numeric sequence;
   transmitting means for transmitting unencrypted said first frame number, the video signal encrypted by the encrypting means, and the first frame number encrypted by the encrypting means;
   receiving means for receiving the unencrypted first frame number, the encrypted video signal, and the encrypted first frame number transmitted by the transmitting means;
   decrypting means for decrypting the encrypted first frame number and the encrypted video signal received by the receiving means, based on a numeric sequence; and
   generating means for generating an initializing pulse based on a second frame number indicating a frame number in a receiver side, the second frame number being generated by decrypting the encrypted first frame number by the decrypting means, and on the unencrypted first frame number received by the receiving means,
   wherein the decrypting means initializes the numeric sequence based on the initializing pulse generated by the generating means.

2. A video-signal processing system according to claim 1, wherein the encrypting means initializes the numeric sequence based on the initializing pulse generated by the generating means.

3. A video-signal processing system according to claim 1, wherein the generating means generates the initializing pulse when the frame number decrypted by the decrypting means is different from the unencrypted frame number received by the receiving means.

4. A video-signal processing system according to claim 1, wherein the encrypting means and the transmitting means are included in a first video-signal processing apparatus, and
   the receiving means, the decrypting means, and the generating means are included in a second video-signal processing apparatus.

5. A video-signal processing system according to claim 1, wherein communication between the transmitting means and the receiving means is performed through a digital interface.

6. A video-signal processing system according to claim 1, wherein the transmitting means also transmits a synchronizing pulse for synchronizing generation of the numeric sequence, and
   the receiving means also receives the synchronizing pulse.

7. A video-signal processing method for a video-signal processing system for processing a video signal, the method comprising:
   an encrypting step of encrypting the video signal and a first frame number, which indicates a frame number of the video signal to be transmitted, based on a numeric sequence;
   a transmitting step of transmitting unencrypted said first frame number, the video signal encrypted in the encrypting step, and the first frame number encrypted in the encrypting step;
   a receiving step of receiving the unencrypted first frame number, the encrypted video signal, and the encrypted first frame number transmitted in the transmitting step;
   a decrypting step of decrypting the encrypted first frame number and the encrypted video signal received in the receiving step, based on a numeric sequence; and
   a generating step of generating an initializing pulse based on a second frame number indicating a frame number in a receiver side, the second frame number being generated by decrypting the encrypted first frame number in the decrypting step, and on the unencrypted first frame number received in the receiving step,
   wherein, in the decrypting step, the numeric sequence is initialized based on the initializing pulse generated in the generating step.

8. A tangible computer-readable storage medium containing a computer-readable program for processing a video signal, the program comprising:
   an encrypting step of encrypting the video signal and a first frame number, which indicates a frame number of the video signal to be transmitted, based on a numeric sequence;
   a transmitting step of transmitting unencrypted said first frame number, the video signal encrypted in the encrypting step, and the first frame number encrypted in the encrypting step;
   a receiving step of receiving the unencrypted first frame number, the encrypted video signal, and the encrypted first frame number transmitted in the transmitting step;
   a decrypting step of decrypting the encrypted first frame number and the encrypted video signal received in the receiving step, based on a numeric sequence; and
   a generating step of generating an initializing pulse based on a second frame number indicating a frame number in a receiver side, the second frame number being generated by decrypting the encrypted first frame number in the decrypting step, and on the unencrypted first frame number received in the receiving step,
   wherein, in the decrypting step, the numeric sequence is initialized based on the initializing pulse generated in the generating step.

9. An information processing apparatus, comprising:
   a processor; and
   instructions executable by the processor for performing a method of processing a video signal, the method including:
   (a) encrypting the video signal and a first frame number, which indicates a frame number of the video signal to be transmitted, based on a numeric sequence;
   (b) transmitting unencrypted said first frame number, the video signal encrypted in the encrypting step, and the first frame number encrypted in the encrypting step;
   (c) receiving the unencrypted first frame number, the encrypted video signal, and the encrypted first frame number transmitted in the transmitting step;
   (d) decrypting the encrypted first frame number and the encrypted video signal received in the receiving step, based on a numeric sequence; and
   (e) generating an initializing pulse based on a second frame number indicating a frame number in a receiver side, the second frame number being generated by decrypting the encrypted first frame number in the decrypting step, and on the unencrypted first frame number received in the receiving step, wherein, in step (d), the numeric sequence is initialized based on the initializing pulse generated in step (e).

10. A video-signal processing apparatus for processing a video signal, comprising:

encrypting means for encrypting the video signal and a first frame number, which indicates a frame number of the video signal to be transmitted, based on a numeric sequence;

transmitting means for transmitting unencrypted said first frame number, the video signal encrypted by the encrypting means, the first frame number encrypted by the encrypting means, and receiving means for receiving a synchronizing pulse for synchronizing generation of the numeric sequence, wherein said synchronizing pulse is generated when a second frame number, generated by decrypting the encrypted first frame number, is not equal to the unencrypted first frame number.

11. A video-signal processing apparatus according to claim 10, further comprising receiving means for receiving an initializing pulse for initializing the numeric sequence transmitted from a receiver side, wherein the encrypting means initializes the numeric sequence based on the initializing pulse received by the receiving means.

12. A video-signal processing method for a video-signal processing apparatus for processing a video signal, the method comprising:

an encrypting step of encrypting the video signal and a first frame number, which indicates a frame number of the video signal to be transmitted, based on a numeric sequence; and a transmitting step of transmitting unencrypted said first frame number, the video signal encrypted in the encrypting step, the first frame number encrypted in the encrypting step, and a receiving step of receiving a synchronizing pulse for synchronizing generation of the numeric sequence, wherein said synchronizing pulse is generated when a second frame number, generated by decrypting the encrypted first frame number, is not equal to the unencrypted first frame number.

13. A tangible computer-readable storage medium having a computer-readable program recorded thereon for processing a video signal, the program being executable by a processor to perform a method, the method comprising:

an encrypting step of encrypting the video signal and a first frame number, which indicates a frame number of the video signal to be transmitted, based on a numeric sequence;

a transmitting step of transmitting unencrypted said first frame number, the video signal encrypted in the encrypting step, the first frame number encrypted in the encrypting step, and a receiving step of receiving a synchronizing pulse for synchronizing generation of the numeric sequence, wherein said synchronizing pulse is generated when a second frame number, generated ted by decrypting the encrypted first frame number, is not equal to the unencrypted first frame number.

14. An information processing apparatus, comprising:
a processor; and
instructions executable by the processor for performing a method of processing a video signal, the method including:

(a) encrypting the video signal and a first frame number, which indicates a frame number of the video signal to be transmitted, based on a numeric sequence;

(b) transmitting unencrypted said first frame number, the video signal encrypted in the encrypting step, the first frame number encrypted in the encrypting step, and (c) receiving a synchronizing pulse for synchronizing generation of the numeric sequence, wherein said synchronizing guise is generated when a second frame number, generated by decrypting the encrypted first frame number, is not equal to the unencrypted first frame number.

15. A video-signal processing apparatus for processing a video signal, comprising:

receiving means for receiving an unencrypted first frame number indicating a frame number of the video signal, encrypted said video signal, and encrypted said first frame number;

decrypting means for decrypting the encrypted first frame number and the encrypted video signal received by the receiving means, based on a numeric sequence; and generating means for generating an initializing pulse based on a second frame number indicating a frame number in a receiver side, the second frame number being generated by decrypting the encrypted first frame number by the decrypting means, and on the unencrypted first frame number received by the receiving means, wherein the decrypting means initializes the numeric sequence based on the initializing pulse generated by the generating means.

16. A video-signal processing apparatus according to claim 15, wherein the generating means generates the initializing pulse when the frame number decrypted by the decrypting means is different from the unencrypted frame number received by the receiving means.

17. A video-signal processing apparatus according to claim 15, further comprising transmitting means for transmitting the initializing pulse to the party on the other end which has transmitted the encrypted video signal and first frame number.

18. A video-signal processing method for a video-signal processing apparatus for processing a video signal, the method comprising:

a receiving step of receiving an unencrypted first frame number indicating a frame number of the video signal, encrypted said video signal, and encrypted said first frame number;

a decrypting step of decrypting the encrypted first frame number and the encrypted video signal received in the receiving step, based on a numeric sequence; and a generating step of generating an initializing pulse based on a second frame number indicating a frame number in a receiver side, the second frame number being generated by decrypting the encrypted first frame number in the decrypting step, and on the unencrypted first frame number received in the receiving step, wherein, in the decrypting step, the numeric sequence is initialized based on the initializing pulse generated in the generating step.

19. A tangible computer-readable storage medium containing a computer-readable program for processing a video signal, the program comprising:

a receiving step of receiving an unencrypted first frame number indicating a frame number of the video signal, encrypted said video signal, and encrypted said first frame number;

a decrypting step of decrypting the encrypted first frame number and the encrypted video signal received in the receiving step, based on a numeric sequence; and a generating step of generating an initializing pulse based on a second frame number indicating a frame number in a receiver side, the second frame number being generated by decrypting the encrypted first frame number in the decrypting step, and on the unencrypted first frame number received in the receiving step, wherein, in the decrypting step, the numeric sequence is initialized based on the initializing pulse generated in the generating step.

20. An information processing apparatus, comprising:

a processor; and instructions executable by the processor for performing a method of processing a video signal, the method including:

(a) receiving an unencrypted first frame number indicating a frame number of the video signal, encrypted said video signal, and encrypted said first frame number;

(b) decrypting the encrypted first frame number and the encrypted video signal received in the receiving step, based on a numeric sequence; and (c) generating an initializing pulse based on a second frame number indicating a frame number in a receiver side, the second frame number being generated by decrypting the encrypted first frame number in the decrypting step, and on the unencrypted first frame number received in the receiving step, wherein, in step (b), the numeric sequence is initialized based on the initializing pulse generated in step (c).

* * * * *